US009852563B2

(12) United States Patent
Bergerhoff et al.

(10) Patent No.: US 9,852,563 B2
(45) Date of Patent: Dec. 26, 2017

(54) METHOD AND SYSTEM FOR REMOTE ACCESS CONTROL

(71) Applicant: Continental Intelligent Transportation Systems LLC, Santa Clara, CA (US)

(72) Inventors: Nikolas Bergerhoff, North Vancouver (CA); Ritesh Ahuja, Cupertino, CA (US); Adrian Radu, Sibiu (RO); Tejas Desai, Troy, MI (US); Herbert Froitzheim, Pettendorf (DE); Yao Zhai, Fremont, CA (US); Robert Obermaier, Hemau (DE)

(73) Assignee: Continental Intelligent Transportation Systems, LLC, Santa Clara, CA (US)

( * ) Notice: Subject to any disclaimer, the term of this patent is extended or adjusted under 35 U.S.C. 154(b) by 0 days.

(21) Appl. No.: 15/289,522

(22) Filed: Oct. 10, 2016

(65) Prior Publication Data
US 2017/0053470 A1 Feb. 23, 2017

Related U.S. Application Data

(63) Continuation of application No. 14/869,585, filed on Sep. 29, 2015, now Pat. No. 9,483,886.
(Continued)

(51) Int. Cl.
*H04L 29/08* (2006.01)
*H04L 9/00* (2006.01)
(Continued)

(52) U.S. Cl.
CPC ...... *G07C 9/00309* (2013.01); *B60R 25/2018* (2013.01); *G07C 9/00007* (2013.01);
(Continued)

(58) Field of Classification Search
CPC ............. G07C 9/00007; G07C 9/0031; G07C 9/00119; G07C 9/00166; G07C 9/00174;
(Continued)

(56) References Cited

U.S. PATENT DOCUMENTS

2006/0095385 A1* 5/2006 Atkinson ............... G06F 21/88
705/64
2012/0313796 A1* 12/2012 Lee ..................... B60R 25/2018
340/989
(Continued)

*Primary Examiner* — Dionne H Pendleton

(57) ABSTRACT

A method to learn and then pair with a pre-installed access control system of a vehicle is discussed. Communication is exchanged between the access control system and a backend cloud-based system. Required data of the access control system including its particular authentication code is extracted by a learning device. A vehicle matching data is sent to the backend cloud-based system and the vehicle is registered with the backend cloud-based system. The learning device is registered to the access control system in accordance with learning procedures implemented in the vehicle as remote entry key. The learning device is coupled to a Radio Frequency signal transmitter that has Application-Specific Integrated Circuits to generate stable RF signals at multiple frequency wavelengths. Registration of learning device includes, receiving a first access control telegram message, transmitting the first access control telegram message to the access control system, pairing the learning device with the access control system.

3 Claims, 9 Drawing Sheets

Related U.S. Application Data

(60) Provisional application No. 62/189,648, filed on Jul. 7, 2015, provisional application No. 62/058,410, filed on Oct. 1, 2014.

(51) Int. Cl.
    *G06N 7/00*      (2006.01)
    *G07C 9/00*      (2006.01)
    *B60R 25/20*      (2013.01)
    *H04W 76/02*      (2009.01)

(52) U.S. Cl.
    CPC ..... *G07C 9/00182* (2013.01); *G07C 9/00571* (2013.01); *H04W 76/02* (2013.01); *A63F 2300/532* (2013.01); *G06F 2221/2149* (2013.01); *G07C 2009/00412* (2013.01); *G07C 2009/00769* (2013.01); *G07C 2009/00888* (2013.01)

(58) Field of Classification Search
    CPC ............ G07C 9/00182; G07C 9/00309; G07C 9/00571; G07C 2009/00769; G07C 2009/00793; G07C 2209/63; G07C 2009/00222; G07C 2009/00492; G07C 2209/06; G07C 2209/62; G07C 9/00015; G07C 9/00944; H04W 76/02; H04W 76/04; H04W 76/06; H04W 80/00; H04W 88/00; H04W 92/00; H04W 76/025
    See application file for complete search history.

(56) References Cited

U.S. PATENT DOCUMENTS

| | | |
|---|---|---|
| 2014/0176301 A1* | 6/2014 | Fernandez Banares ............ G07C 9/00015 340/5.26 |
| 2014/0201126 A1* | 7/2014 | Zadeh .................... G06K 9/627 706/52 |
| 2017/0142205 A1* | 5/2017 | Makke .................... H04L 63/10 |

\* cited by examiner

METHOD AND SYSTEM FOR REMOTE ACCESS CONTROL

RELATED APPLICATIONS

This application claims the benefit of U.S. Provisional Patent Application No. 62/189,648, filed Jul. 7, 2015, and entitled "METHOD AND SYSTEM FOR REMOTE ACCESS CONTROL", as well as the benefit of U.S. Provisional Patent Application No. 62/058,410, filed Oct. 1, 2015, entitled 'Package Delivery To and Pick-Up From A Vehicle,' and both are incorporated herein by reference.

FIELD

The design generally relates to a remote access control system for motor vehicles and its various use cases that include a package exchange scenario with a vehicle.

BACKGROUND

Typically, physical key fobs are created and sold with a particular vehicle to allow remote access into the vehicle. This technology instead provides remote creation of a key fob in the field.

SUMMARY

In general, a method to learn and then pair with a pre-installed access control system of a vehicle includes a number of example steps. Communications are exchanged between the pre-installed access control system in that vehicle and either of a backend cloud-based system or by a handheld computer device. When the communications are directly between the handheld computer device and the pre-installed access control system in that vehicle, then additional communications may occur between the handheld computer device and the backend cloud-based system. Communications is exchanged between the pre-installed access control system in that vehicle and a learning device to extract, for one time, any required data for the access control system including its particular authentication code of that vehicle. The pre-installed access control system in that vehicle has one or more receiving devices and a controller that manages key credentials. By sending a set of vehicle matching data to the backend cloud-based system, the vehicle is registered with the backend cloud-based system. The vehicle matching data is then stored in a database associated with the backend cloud-based system. The vehicle matching data is used by a first routine running on servers of the backend cloud-based system to obtain and send a first access control telegram message of the vehicle to the learning device. The learning device, which facilitates as a key like simulator, is registered to a memory in the pre-installed access control system in the vehicle in accordance with learning procedures implemented particular to that vehicle's Make and Model when adding regular remote entry keys. The learning device is registered as an additional remote entry key of the pre-installed access control system of the vehicle. The learning device is coupled to a Radio Frequency signal transmitter. The RF signal transmitter is used for transmitting RF signals to a Radio Frequency receiver associated with the access control system of a vehicle. The RF signal transmitter has one or more Application-Specific Integrated Circuits (ASICs) to be highly configurable in generating a set of two or more stable RF signals at multiple frequency wavelengths. The registration of the learning device to facilitate as the additional remote entry key for the vehicle can include a group of steps. 1) A first access control telegram message with a first set of signaling parameters is received by the learning device from the backend cloud-based system. The first access control telegram message and the signaling parameters can be associated with the vehicle matching data of the vehicle and with a Radio Frequency signal corresponding to the access control system of a vehicle. The first access control telegram message can include a sequence of identification and authorization steps to emulate registering procedures matching the requirements of that particular Make and Model of the vehicle. The backend cloud based server cooperates with the database to select the sequence of identification and authorization steps to emulate registering procedures matching the requirements of that particular Make and Model of the vehicle including the specific frequency wavelengths of access control system to register the additional remote entry key in the access control system of the vehicle. The sequence of identification and authorization steps are communicated with the first access control telegram message, from a set of two or more stored registration procedures in the database. The database indexes the two or more sets of stored registration by Make and Model of a vehicle type. The first access control telegram message can also include the specific frequency wavelengths of access control system to register the additional remote entry key in the access control system of the vehicle. 2) The first access control telegram message is sent to the RF signal transmitter. 3) The first access control telegram message that can include the sequence of identification and authorization steps is transmitted by the RF signal transmitter to the pre-installed access control system of the vehicle. The transmitted RF signals are characterized by the first set of signaling parameters such as the specific frequency wavelengths of access control to emulate registering procedures matching the requirements of the vehicle. 4) The learning device is paired with the pre-installed access control system of the vehicle in accordance with the learning procedures implemented in the vehicle. An ID of the additional remote entry key is registered with the memory in the pre-installed access control system. The backend cloud stores the first access control telegram message in a set of two or more stored registration procedures in the database. The database indexes the two or more sets of stored registration by Make and Model of a vehicle type.

In an embodiment, a client device for learning and then paring with a pre-installed access control system of a vehicle is described. The client device has a learning device that has one or more processors and is configured to perform actions via one or more modules of the learning device that are configured to execute on the one or more processors. The learning device can exchange communications between the pre-installed access control system in that vehicle and a backend cloud-based system or by a handheld computer device. The learning device can exchange communications with the pre-installed access control system to extract, for one time, any required data for the access control system including its particular authentication code of that vehicle. The pre-installed access control system in that vehicle has one or more receiving devices and a controller that manages key credentials. The learning device can obtain and then send a vehicle matching data of the vehicle to the backend cloud-based system to register the vehicle with the backend cloud-based system. The vehicle matching data can be stored in a database associated with the backend cloud-based system. The vehicle matching data can be used to obtain a first access control telegram message of the vehicle from a set of two more access control telegrams stored in the backend cloud-based system. Each of the two more access control telegrams may be particular to a particular Make and Model of a vehicle. The client device also includes a Radio Frequency signal transmitter coupled to the learning device. The RF signal transmitter can transmit RF signals to a Radio Frequency receiver associated with the access control system of the vehicle. The RF signal transmitter has one or more Application-Specific Integrated Circuits (ASICs) and can generate a set of two or more stable RF signals at multiple frequency wavelengths. The learning device can to be registered to a memory in the pre-installed access control system in the vehicle. The learning device can to be registered in accordance with learning procedures implemented in the vehicle when adding regular remote entry keys. The learning device can to be registered as an additional remote entry key of the pre-installed access control system of the vehicle. The registration of the learning device as the additional remote entry key of the pre-installed access control system of the vehicle can include the following steps. A first access control telegram message along with a first set of signaling parameters is received by the learning device from the backend cloud-based system. The first access control telegram message and the signaling parameters can be associated with the vehicle matching data of the vehicle and a Radio Frequency signal corresponding to the access control system of the vehicle. The first access control telegram message can include a sequence of identification and authorization steps to emulate registering procedures matching the requirements of the vehicle. The first access control telegram message can also include the specific frequency wavelengths of access control system to register the additional remote entry key in the access control system of the vehicle. Then the learning device can send the first access control telegram message to the RF signal transmitter. Then the RF signal transmitter can transmit the first access control telegram message including the sequence of identification and authorization steps for that Make and Model of vehicle to the pre-installed access control system of the vehicle. The transmitted RF signals can be characterized by the first set of signaling parameters including the specific frequency wavelengths of access control that can emulate registering procedures matching the requirements of the vehicle. Next, the learning device is paired with the pre-installed access control system of the vehicle in accordance with the learning procedures implemented in the vehicle. An ID of the additional remote entry key can be registered with the memory in the pre-installed access control system.

BRIEF DESCRIPTION OF THE DRAWINGS

The multiple drawings refer to the example embodiments of the design.

Figure 1:
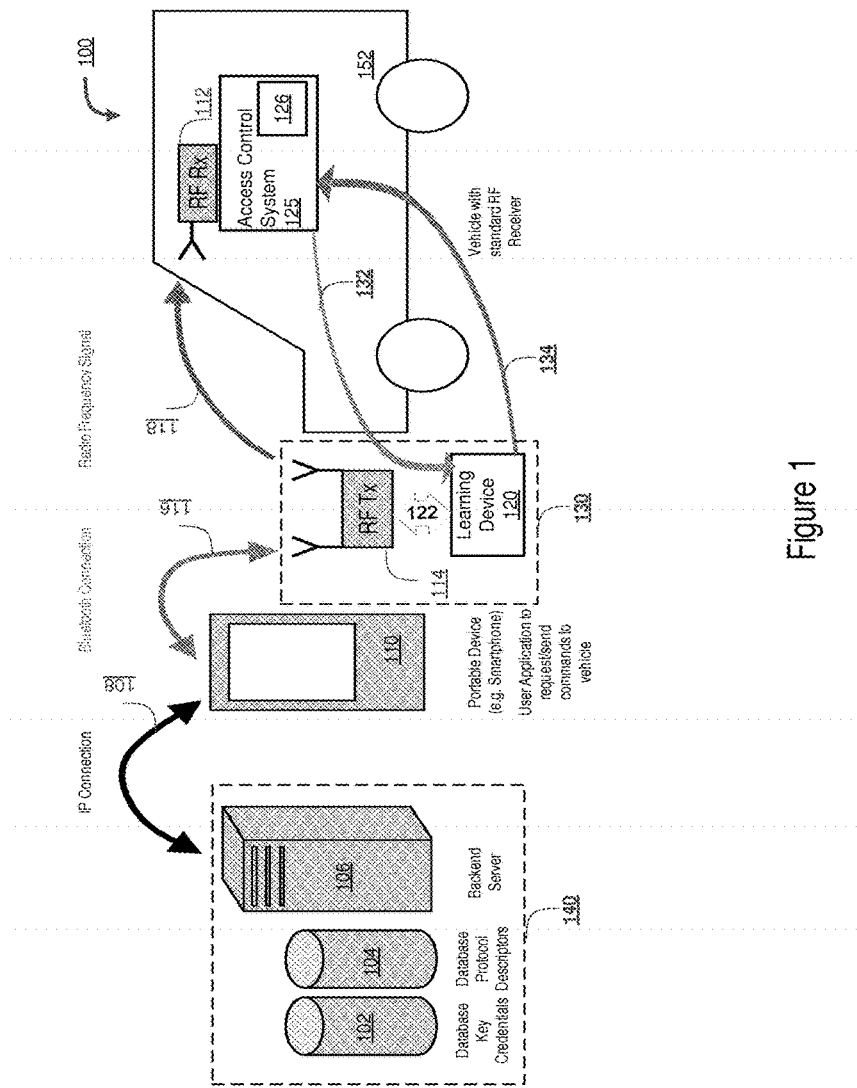
FIGS. 1-3 illustrate a block diagram of various embodiments of the remote access system to a vehicle using a backend cloud-based provider site.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

In general, a client device can be used in the field such that a pre-installed access control system of a target vehicle can learn an additional remote entry key of the pre-installed access control system. The additional remote entry key can be registered as an additional key fob with the access control system of the vehicle. The registration can happen in accordance with learning procedures implemented in the vehicle when adding regular remote entry keys and result in pairing the additional remote entry key with the pre-installed access control system of the vehicle. The client device has a learning device that can be used as a medium for receiving learning commands and then transmitting the learning commands to the access control system of the vehicle. In general the learning commands depend on Make and Model of the vehicle. In a database of a backend cloud-based system, the learning commands of a number of vehicles based on Make and Model are stored as access control telegram messages. Including in the access control telegram messages or in addition to them, signaling parameters of the access control system of the vehicles based on Make and Model are stored as well as a sequence of identification and authorization steps. The client device includes a Radio Frequency signal transmitter that is either coupled to the learning device or is included in the learning device. The RF signal transmitter has one or more Application-Specific Integrated Circuits (ASICs) to be highly configurable in generating a set of two or more stable RF signals at multiple frequency wavelengths. The RF signal transmitter can be used for transmitting RF signals to a Radio Frequency receiver associated with the access control system of the vehicle. The signaling parameters can be used to adjust the RF signal transmitter to the specific settings, including specific wavelengths, required for a specific Make and Model of a vehicle. Additionally, the database of the backend cloud-based system can include mathematical algorithms based on Make and Model of the vehicles to calculate the authorization keys of the access control system of the vehicle. The processors associated with the servers of the backend cloud-based system can execute the algorithms and obtain the authorizations keys of vehicles based on Make and Model. By executing the algorithms, the backend cloud-based system can obtain the first as well as the consecutive authorization keys of the vehicles. Alternatively, the first authorization key as well as the consecutive authorization keys of the vehicles, in addition to Make and Model, may depend on Vehicle Identification Number (VIN) of the vehicle. The backend cloud-based system either directly communicates with the learning device or communicates through a handheld computer device and sends an access control telegram message for paring the learning device with the access control system of the vehicle. The learning device then communicates the access control telegram message to the RF signal transmitter coupled to it. The RF signal transmitter uses the access control telegram message and signaling parameters to adjust the parameters, including wavelength, of the transmitted RF signal to the RF receiver associated with the access control system of the vehicle. After transmitting the access control telegram message including the sequence of identification and authorization steps from the RF signal transmitter to the RF receiver of pre-installed access control system of the vehicle, the registering procedures matching the requirements of the vehicle is emulated and the learning device is paired with the access control system of the vehicle. Alternatively, the backend cloud-based system may send the mathematical algorithms to calculate the authorization keys of the access control system of the vehicle to the handheld computer device and the handheld computer device may calculate the authorization keys of the access control system of the vehicle based on Make and Model. Additionally, after paring and in a subsequent point of time, either the backend cloud-based system or the handheld computer device can bypass the learning device and directly communicate with the RF signal transmitter and send another access control telegram message and a valid authorization key to the RF signal transmitter for commanding the access control system of the vehicle to perform actions such as unlocking doors, opening windows, opening trunks, closing trunks, turning engine on, turning engine off, opening and closing a sunroof or moon roof of the vehicle.

Figure 4:
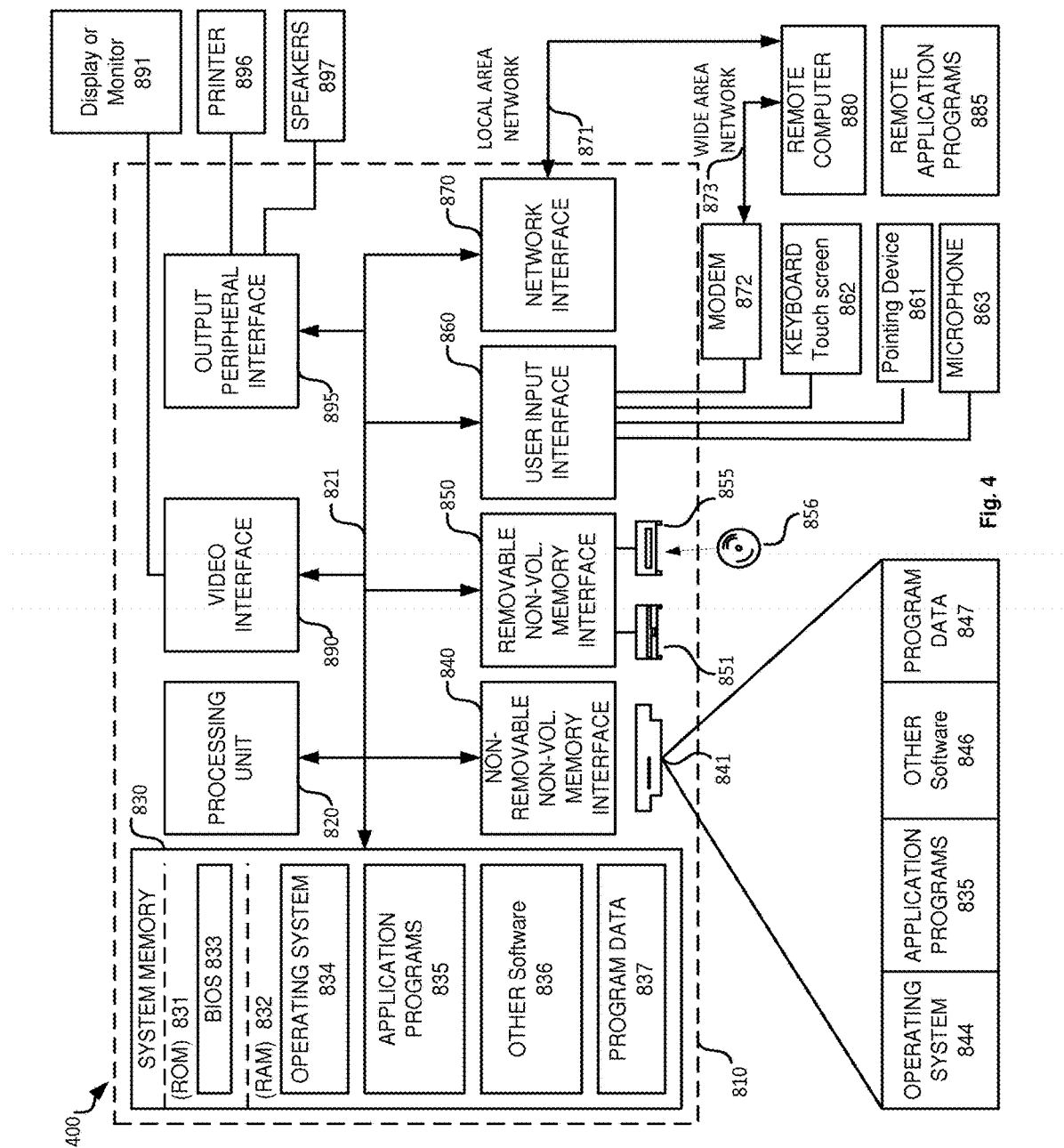
FIG. 4 illustrates a block diagram of an example computing system that may be used in an embodiment of one or more of the servers, in-vehicle electronic modules, and client devices discussed herein.
Figure 5:
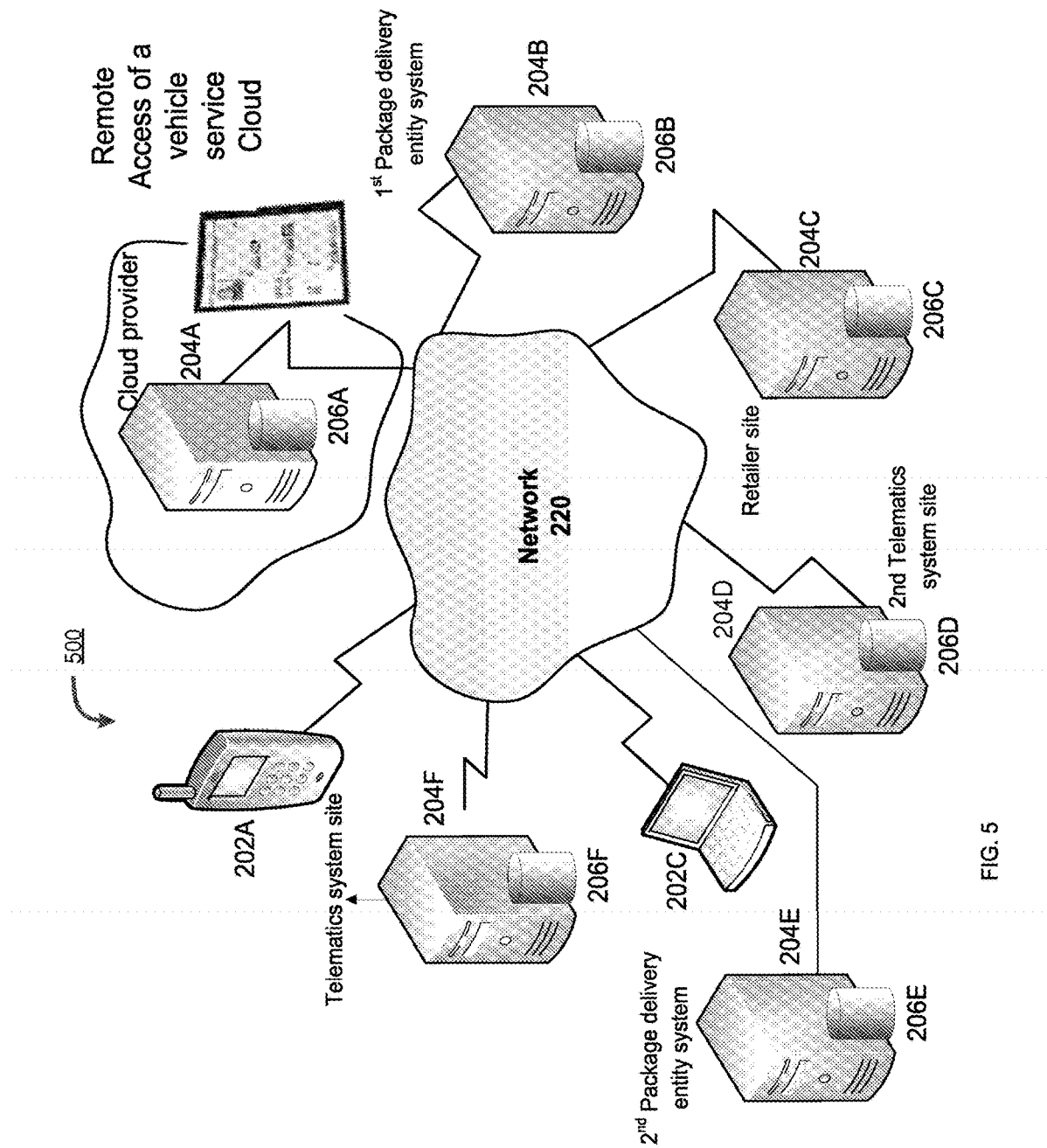
FIGS. 5-6 illustrate block diagrams of embodiments of the remote access to a vehicle service hosted on a cloud-based provider site.
Figure 6:
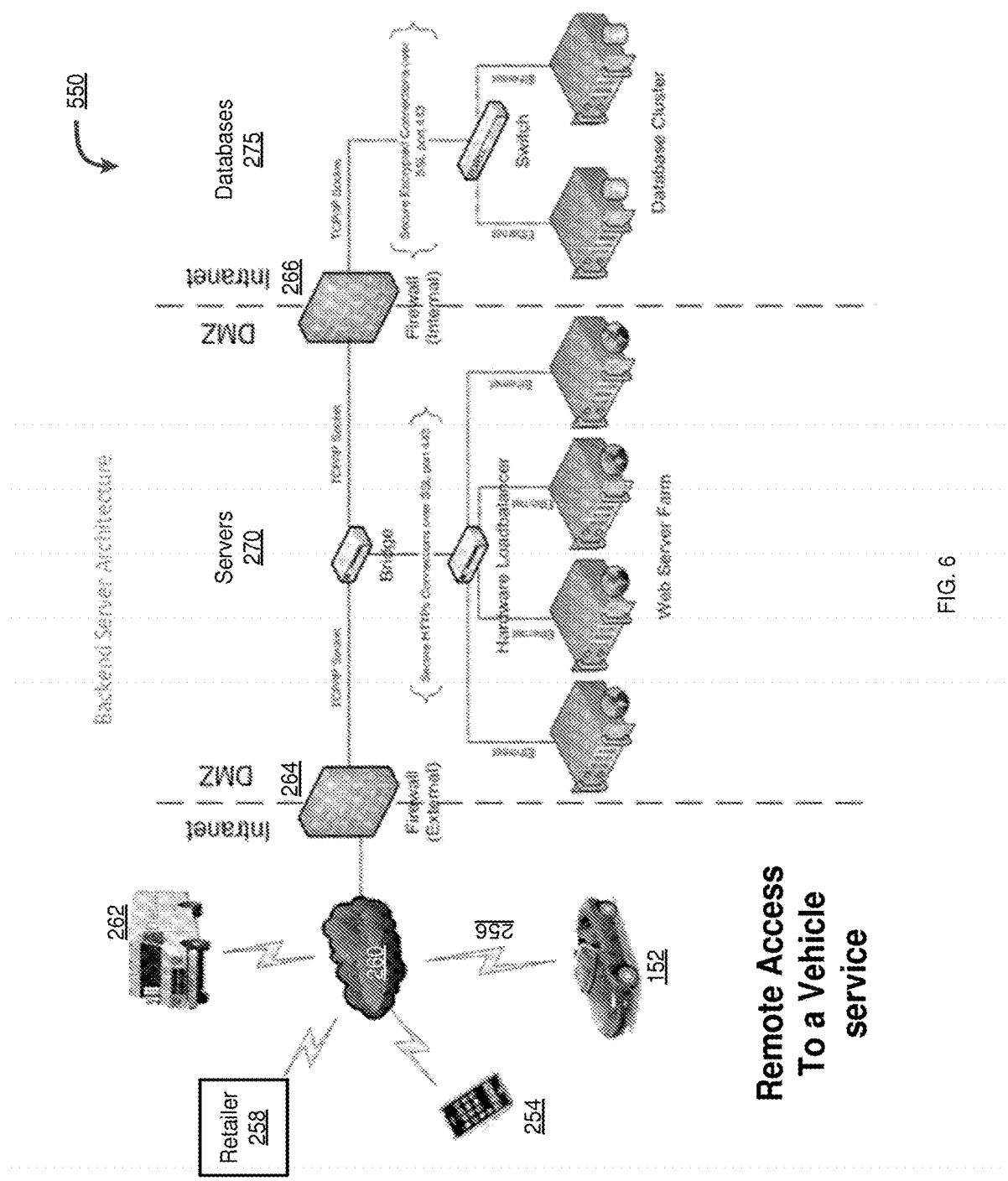

In general, the remote access system to a vehicle uses a backend cloud-based provider site. The following drawings and text describe various example implementations of the design. FIG. 4 and FIGS. 5-6 illustrate additional example environments to implement the concepts.

Objective of the Design & Problems to be Solved

The design seeks to enable vehicle owners and other authorized persons to access and operate vehicles in a convenient and cost efficient way. Use cases are for example:
  Alternative access means for vehicle owners
  Package delivery into vehicles by authorized delivery carriers
  Car sharing
  Access to rental cars Approximately 70% of all light vehicles on the roads globally today (approx. 700 million vehicles) have an RKE system installed. Approx. 85% of all light vehicles being manufactured today have an RKE system installed (approx. 80 million vehicles p.a.). Approximately 95% have an LF immobilizer installed.

By using the existing RF receiver installed in those vehicles and their corresponding communication protocols the design addresses a particular large amount of vehicles other than Cellular Telematic Systems which currently address less than 10% of the vehicle stock. Smartphone-to-Vehicle systems are hardly relevant at all at this point in time, since volumes are very low due to relatively high hardware costs for the required NFC, Bluetooth or Wi-Fi transceiver in the vehicle (whether retrofitted or as original equipment).

In an embodiment, the design uses a learning device for the sole purpose of extracting the required data once for the particular vehicle and then registering the vehicle in the backend cloud site. (=principle No 1). The design also logically splits a typical key fob into separate hardware portions that are dynamically configurable i) (aka handheld RF signal transmitter, "Delivery Transmitter"), ii) a software portion calculating the messages (aka routine in the backend server or app in the smartphone) and iii) the mechanical or software buttons in the app in the smartphone (aka option for the consumer to authorize access to the vehicle via this app) to allow access to the vehicle (=principle No 2), once the initial sign up process has been done with the backend server.

The design allows programming an additional key ID device into almost any vehicle without any change required on the vehicle side. The programmed device is then emulated by a highly configurable RF signal transmitter hardware that is remote controlled by a backend server.

Further, the design discloses embodiments that are suitable for retrofit as well as original equipment scenarios. In summary, the design seeks to address the largest amount of vehicles with the lowest possible cost without the transactional inconvenience of having to physically hand out regular car keys to other persons who seek to access the vehicle. The design has many embodiments, three are shown in FIGS. 1-3 to use a backend cloud site and one or more local computing devices to give access to a particular vehicle associated with a given user.

Figure 2:
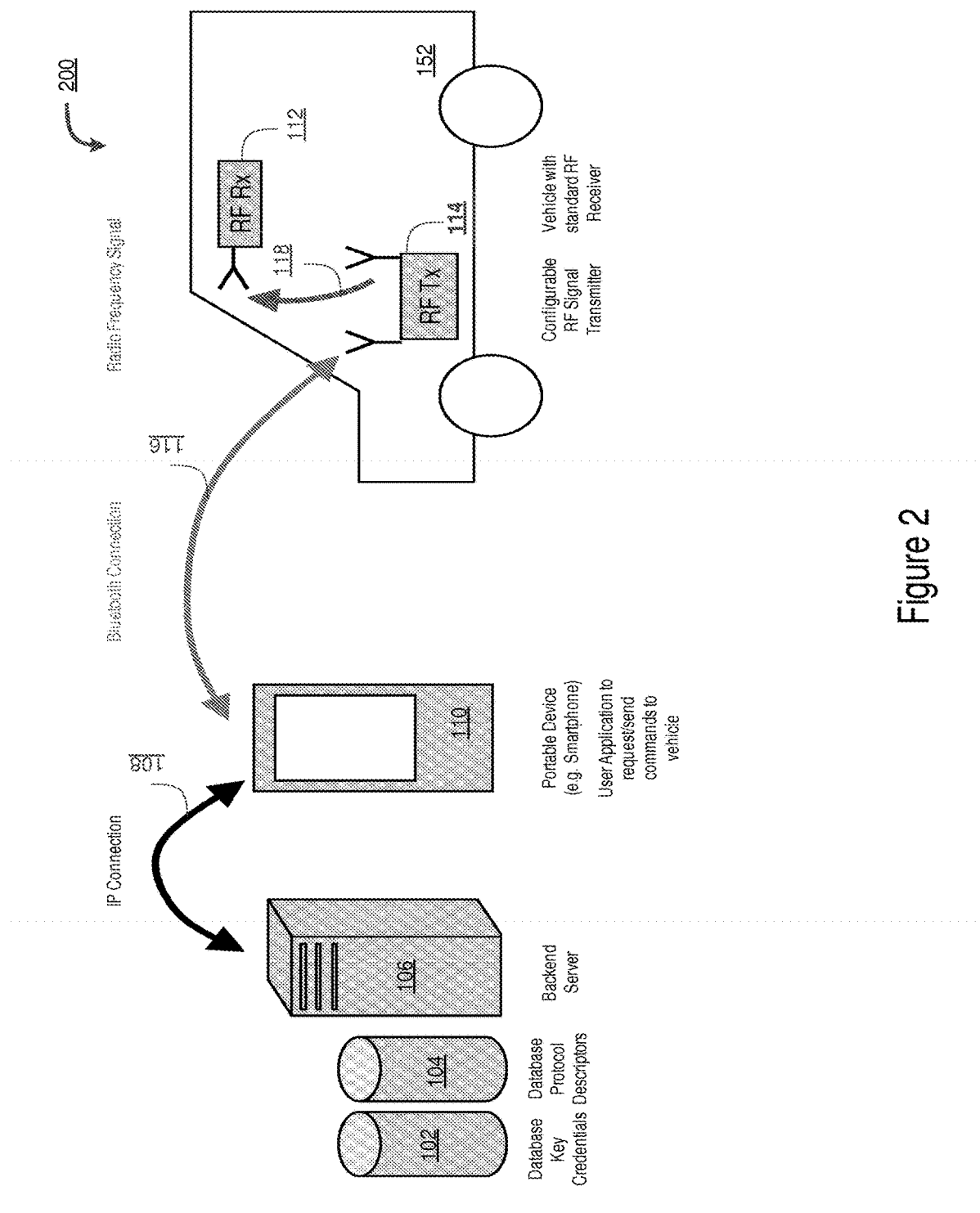
Figure 3:
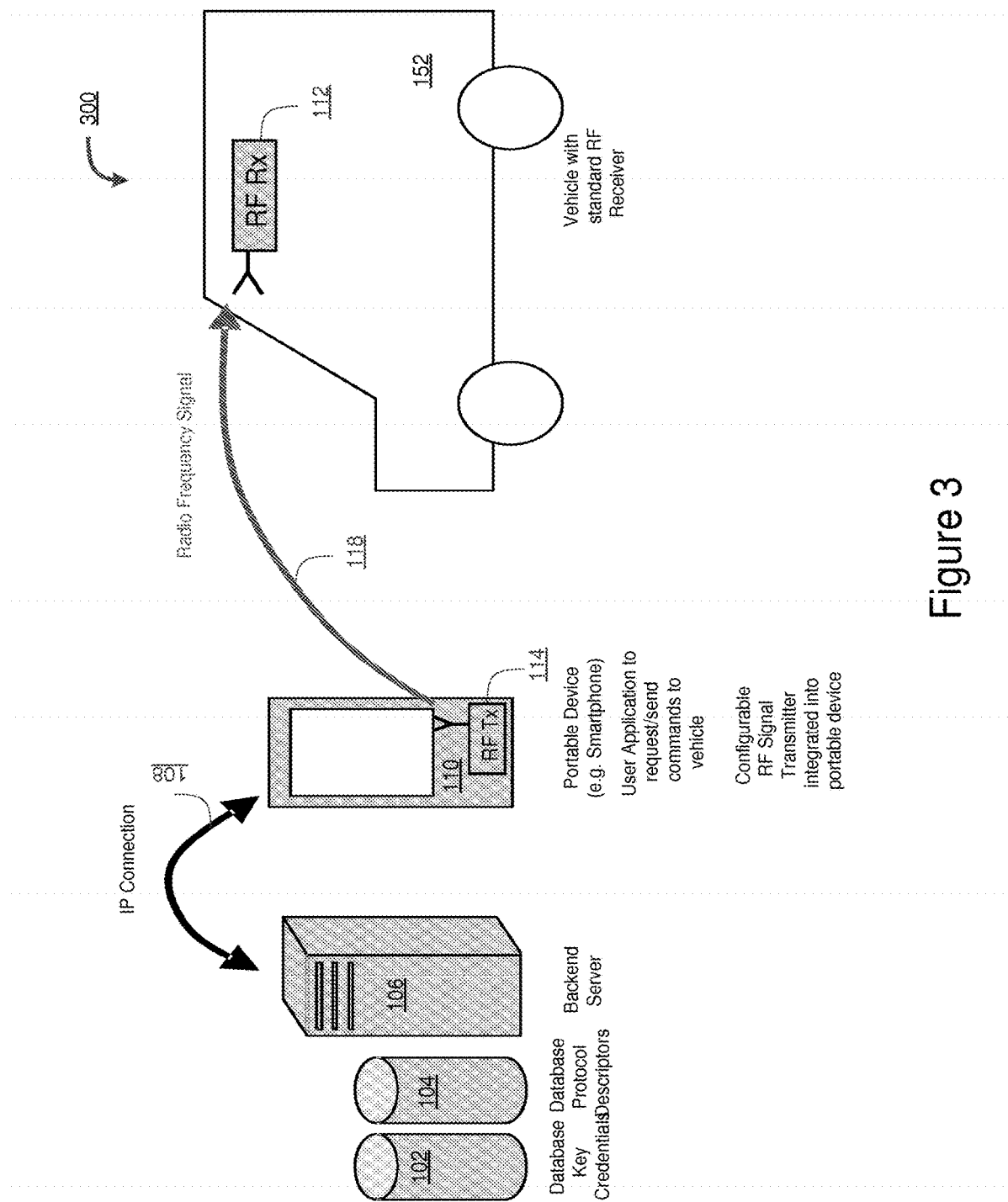

FIGS. 1-3 illustrate a block diagram of various embodiments of the remote access system to a vehicle using a backend cloud-based provider site.

A client device 130 for learning and then pairing a pre-installed access control system 125 of a vehicle 152 can include a learning device 120 that has one or more processors. The learning device can perform actions via one or more modules of the client device that can execute on the one or more processors. The learning device 120 can exchange communication between the pre-installed access control system 125 in that vehicle 152 and a backend cloud-based system 140 or by a handheld computer device 110.

The learning device 120 of the client device 130 can exchange communication with the pre-installed access control system 125 to extract any required data for the access control system 125 including its particular authentication code, one time, for the vehicle 152. The pre-installed access control system 125 in that vehicle 152 can have one or more receiving devices and a controller that manages key credentials.

Also, the learning device 120 can obtain and then send a vehicle matching data of the vehicle 152 to the backend cloud-based system 140 and can register the vehicle 152 with the backend cloud-based system 140. The vehicle matching data is stored in a database associated with the backend cloud-based system 140. The vehicle matching data can be used to obtain a first access control telegram message of the vehicle 152 from the backend cloud-based system 140.

Additionally, a Radio Frequency signal transmitter 114 can be coupled to the learning device 120 via connection 122. The RF signal transmitter 114 can transmit RF signals to the RF receiver 112 associated with the access control system 125 of the vehicle 152. The RF signal transmitter 114 can have one or more Application-Specific Integrated Circuits (ASICs) and can generate a set of two or more stable RF signals at multiple frequency wavelengths.

Also, the learning device 120 can be registered to a memory 126 in the pre-installed access control system 125 in the vehicle 152 in accordance with learning procedures implemented in the vehicle 152 when adding regular remote entry keys. The learning device 120 can be registered as an additional remote entry key of the pre-installed access control system 125 of the vehicles 152.

Additionally, the registration of the learning device 120 as the additional remote entry key of the pre-installed access control system 125 of the vehicle 152 can include a number of steps. In the first step, the learning device 120 can receive, a first access control telegram message along with a first set of signaling parameters. The first access control telegram message and the first set of signaling parameters can be associated with the vehicle matching data of the vehicle 152 and the RF signals corresponding to the access control system 125 of the vehicle 152. The first access control telegram message and the first set of signaling parameters can be received from the backend cloud-based system 140. The first access control telegram message can have a sequence of identification and authorization steps to emulate registering procedures matching the requirements of the vehicle 152 such as the specific frequency wavelengths of access control system 125 to register the additional remote entry key in the access control system 125 of the vehicle 152.

In the second step for the registration of the learning device 120 as the additional remote entry key of the pre-installed access control system 125, the learning device 120 can send the first access control telegram message to the RF signal transmitter 114.

In the third step for the registration of the learning device 120 as the additional remote entry key of the pre-installed access control system 125, the RF signal transmitter 114 can transmit the first access control telegram message to the pre-installed access control system 125 of the vehicle 152. The first access control telegram message can include the sequence of identification and authorization steps. The transmitted RF signals can be characterized by the first set of signaling parameters that emulate registering procedures matching the requirements of the vehicle 152 such as the specific frequency wavelengths of access control system 125.

In the fourth and final step for the registration of the learning device 120 as the additional remote entry key of the pre-installed access control system 125, the learning device 120 can be paired with the pre-installed access control system 125 of the vehicle 152 in accordance with the learning procedures implemented in the vehicle by registering an ID of the additional remote entry key with the memory 126 in the pre-installed access control system 125.

In an embodiment, the RF signal transmitter 114 can include an LF transponder to communicate with an immobilization system in the vehicle. The RF signal transmitter 114 can set specific frequency wavelengths for the immobilization system of the vehicle. In an example, the RF signal transmitter 114 can communicate with the immobilization system in the vehicle through the LF transponder of the RF signal transmitter. The communication can include adjusting the RF signal transmitter for a specific frequency wavelengths of the immobilization system.

Thus, the design includes a method and system to learn and then pair to a pre-installed access control system including its particular authentication code for a particular vehicle. The vehicle's particulars are learned and then paired by a remote backend server or by a handheld computer device (smartphone) by exchanging communications with the pre-installed access control system in that vehicle. The learning device is configured to extract any required data for the access control system including its particular authentication code, one time, for the particular vehicle and then registering the particular vehicle in the backend cloud site, and with receiving device(s) installed in the vehicle and a controller that manages key credentials. The learning a new ID process characterized by the following. A key like learning device is registered to a memory in the access control module in the vehicle in accordance to the procedures implemented in the vehicle when adding regular remote entry keys. The learning device communicates with a handheld computer device (smartphone) and/or directly with the remote backend server. The handheld RF signal transmitter has one or more ASICs to be highly configurable in generating a set of two or more stable RF signals at different frequency wavelengths, which is remote controlled by the software commands in the access control telegram message issued from a backend server. The handheld RF signal transmitter may also have a LF transponder to communicate with an immobilization circuit in the vehicle. The learning device transmits vehicle matching data required to generate control messages and authentication code to a handheld computer device (smartphone) and/or remote backend server. A handheld computer device (smartphone) and/or remote backend server transmits signaling parameters and message flow to the learning device in order to emulate registering procedures matching the requirements of the vehicle including the specific frequency wavelengths of access control and specific frequency wavelengths for the immobilization systems of the vehicle.

The learning device is configured to incorporate learning a device ID of a key fob simulator into the access control system of a vehicle by use of an LF transponder in conjunction with or in place of learning by RF protocols. The device may learn and then pair with a pre-installed access control system of a vehicle. Communication is exchanged between the pre-installed access control system in that vehicle and i) a backend cloud-based system having one or more servers running on a first group of one or more processors or ii) a handheld computer device having a second group of one or more processors. Communication is exchanged communication between the pre-installed access control system in that vehicle and a learning device to extract any required data for the access control system including its particular authentication code, one time, for that vehicle, where the pre-installed access control system in that vehicle has one or more receiving devices and a controller that manages key credentials. The vehicle and its information is registered with the backend cloud-based system by sending a set of vehicle matching data to the backend cloud-based system. The set of vehicle matching data is stored in a database associated with the backend cloud-based system and is used by a routine running on the first group of processors of the servers of the backend cloud-based system to obtain and send one or more access control telegram messages for the vehicle. The learning device, which facilitates as a key like simulator, is registered to a memory in the pre-installed access control system in the vehicle in accordance with learning procedures implemented particular to that vehicle's Make and Model when adding regular remote entry keys as an additional remote entry key of the pre-installed access control system of the vehicle. The learning device is coupled to a Radio Frequency signal transmitter via being located inside the learning device or attached to the learning device. The RF signal transmitter is used for transmitting RF signals to a Radio Frequency receiver associated with the access control system of the vehicle. The learning device is also coupled to a Low Frequency (LF) transponder via being located inside the learning device or attached to the learning device. The LF transponder is used for communicating LF signals with an immobilization system associated with the access control system of the vehicle. The RF signal transmitter has one or more Application-Specific Integrated Circuits (ASICs) to be highly configurable in generating a set of two or more stable RF signals at multiple frequency wavelengths. The LF transponder may communicate in two or more frequency wavelengths as well.

The registration of the learning device to facilitate as the additional remote entry key for the vehicle includes the following steps. A first LF transponder configuration and data memory set corresponding to the access control system of the vehicle is received by the learning device from the backend cloud-based system. The first LF transponder configuration and data memory set matches the requirements of that particular Make and Model of the vehicle including the specific frequency wavelengths of access control system to register the additional remote entry key in the access control system of the vehicle. The backend cloud based server cooperates with the database to select the first LF transponder configuration and data memory set from a set of two or more LF transponder configuration and data memory sets organized by the Make and Model of a vehicle. The learning device is paired with the pre-installed access control system of the vehicle by communication between LF transponder and the immobilization unit. The learned data and configuration for at least one or both of the RF communication and the LF communication from the learning device is then transmitted back to the backend cloud system. The backend cloud system then uses the stored data for further communication with the vehicle as discussed herein.

When start authorization of a vehicle's engine is a feature that the RF signal transmitter is configured to generate, the RF signal transmitter device will typically also require the LF hardware components to communicate with the vehicle's LF immobilizer and receive data from the vehicle's LF transmitter. Optionally, the RF signal transmitter may also configure the optional LF interface, receive and decipher LF messages from the vehicle and send LF or RF signals in return.

FIGS. 2 and 3 show examples of embodiments that the learning device can be bypassed and either the backend cloud-based system 140 or the handheld computer device 110 can directly communicate with the RF signal transmitter 114. As shown, the handheld computer device 110 can use Bluetooth or Wi-Fi communication 116 to communicate with the RF signal transmitter 114. Alternatively, the backend cloud-based system 140 can use cellular communication to communicate directly to the RF signal transmitter 114. In an example, the backend cloud-based system 140 can use cellular communication 108 to communicate with the handheld computer device 110 and then use Bluetooth or Wi-Fi communication 116 to communicate from the handheld computer device 110 to the RF signal transmitter 114.

This system simulating a remote key fob integrates buttons, software to calculate vehicle specific telegrams and hardware to generate vehicle specific radio frequency wavelengths separates these functions into two or more physical devices. The system simulating a remote key fob, which has been programmed to the vehicle during initial set-up, is now logically split into three parts:

a) The mechanical buttons remain with the user, but in a smartphone application: The user may push buttons in the app to send commands to the vehicle.

b) The software that generates valid telegrams is now in the backend server. The calculation of parameters for the telegram can be calculated by the backend server or locally by processors in the smart phone. The backend site also references the databases for how to compose the sequence of back and forth communications with the on-board intelligence in the vehicle for the telegrams on a per particular vehicle basis.

c) The RF circuitry hardware which generates the radio frequency signal to the vehicle is now i) located with the hand held computing device with the delivery associate, ii) located in a separate radio frequency device that couples with and cooperates with the hand held computing device, or iii) is installed in the vehicle and communicates with the hand held computing device. The RF circuitry hardware "Delivery Transmitter" relays a valid telegram received from the server Backend or from the local smart phone.

The design includes a method and system to control, at least, access to a vehicle from a backend server that sends an access control telegram to a local client device, which establishes communication with the RF access control module in the vehicle with a receiving device installed in the vehicle and a controller that grants access upon successful authentication. The remote access process may be characterized by the following. The remote backend server generates an access control telegram message and then sends the access control telegram either directly or as an executable software package to a local handheld computer device (such as a smartphone). The backend server is configured to cooperate with one or more databases to generate valid telegrams for vehicles of different models as well as for vehicles from two or more different vehicle manufactures. Next, a calculation of a key authentication code particular for that unique vehicle with one or more processors can occur i) in the remote backend server when sent directly or ii) in the handheld computer device (smartphone) when sent as an executable software package. The server can transfer said access control telegram message and authentication code together with signaling parameters to a handheld RF signal transmitter i) either located in the handheld computer; or ii) located as an attached device cooperating with the handheld computer; or iii) located inside the vehicle. The handheld RF signal transmitter is configured to propagate said access control telegram message and authentication code via an electromagnetic signal characterized by signaling parameters to the RF receiving circuit originally installed in the vehicle. The handheld RF signal transmitter has one or more ASICs to be highly configurable in generating a set of two or more stable RF signals at different frequency wavelengths, which is remote controlled by the software commands in the access control telegram message issued from a backend server.

Main problems to be solved by the design are the following. The backend server cloud site includes:

A database configured with a plurality of remote keyless entry systems. The database contains a set of numerous RKE systems and their corresponding particulars. RKE systems are not standardized. The communication protocols are highly fragmented. Even within one brand, different vehicle models will have different protocols depending on the model year, equipment level of the individual car, the supplier of the RKE system and the country of registration with corresponding frequency bands and allowed electromagnetic emission levels. The database contains a superset of these various RKE systems and their corresponding particulars.

A database configured with a plurality of immobilizer systems. The database contains a set of numerous immobilizer systems and their corresponding particulars. Immobilizer systems are not standardized. The communication protocols are fragmented and encryption standards have frequently changed over time. The database contains a superset of these various immobilizer systems and their corresponding particulars.

A database configured with a plurality of programming/learning key procedures. The database contains a set of numerous programming/learning key procedures and their corresponding particulars. Procedures for programming/learning key devices to a vehicle are not standardized. The procedures are highly fragmented and range from users being able to trigger a programming session by running through a certain sequence in the vehicle to diagnostic tester sessions which even require high security online connections to the OEMs database servers.

The security of the system must be comparable to any of today's accepted solutions.

The "intelligence" (communication logic) is moved out of the physical key device into routines in the server in the backend cloud site where a set of databases cooperating with the routines in the server to construct telegrams to access and start a plurality of multiple vehicles models from a vehicle manufacturer as well as vehicles from multiple different vehicle manufacturers. The backend server is configured to generate valid telegrams for vehicles of different models as well as for vehicles from two or more different vehicle manufactures.

The "intelligence" (communication logic) is abstracted by protocol descriptors in order to address multiple vehicles models from a vehicle manufacturer as well as vehicles from multiple different vehicle manufacturers.

The hardware of the key device simulator in or cooperating with the local handheld computing device is designed in a way that it is possible to configure the physical RF parameters, LF parameters, as well as the encryption standards "on the fly", i.e., just by software commands, where the encryption of intelligence is configured to include changing the center frequency of the base carrier wavelength signal, modulation of the frequency, modulation of the phase, and/or modulation of the amplitude of the base carrier wavelength signal. The RF transmitter device is configured with a first ASIC chip with clock circuits to generate a set of RF frequencies that can change the center frequency of the base carrier wavelength signal via a series of DLL loops, modulate the frequency, modulate the phase, and/or modulate the amplitude of the base carrier wavelength signal, as well as a second ASIC chip with clock circuits to generate a set of LF frequencies.

The design allows access control systems enable vehicle users to unlock/lock and operate/start motor vehicles. Various aspects of embodiments of the design incorporate:

A key simulator equipped with a passive LF transponder to communicate with a vehicle installed immobilizer.

Remote Control Key Fobs simulator equipped with a passive LF transponder to communicate with a vehicle installed immobilizer and a Radio Frequency transmitter to send commands upon button presses on the key device to a Radio Frequency receiver installed in the vehicle. This is also referred to as RKE (Remote Keyless Entry). Now, a smart phone application presents a UI to allow the user of the smartphone client device to push buttons of the UI to send commands to the vehicle.

Passive Key Fobs simulator equipped with a passive LF transponder to communicate with a vehicle installed immobilizer, an active LF receiver receiving data from an LF transmitter installed in the vehicle and a Radio Frequency transmitter to send data to a Radio Frequency receiver installed in the vehicle. Communication is trigger by approaching the vehicle, touching a door handle, pushing a start button, etc. No manual interaction with the key device is necessary. This is also referred to as PASE (Passive Start and Entry). Now, a smart phone application may also establish communications with the vehicle without manual interaction.

Cellular Telematic System: User sends a command from a typically handheld computer device (e.g. smartphone) to a web portal. The web portal communicates via a cellular connection with the TCU (Telematic Control Unit) installed in the vehicle, which in turn communicates with other control units in the vehicle to unlock/lock doors, start the engine etc.

Smartphone-to-Vehicle System: In this embodiment a user's smartphone communicates directly with a vehicle installed transceiver, typically over NFC, Bluetooth or Wi-Fi. The Smartphone contains specific code and credentials, which allows sending commands to the vehicle. The smartphone may be provisioned by a backend server, in particular apps and credentials may be provisioned. The vehicle installed RF transceiver and/or LF transceiver forwards commands to other control units in the vehicle to unlock/lock doors, start the engine, etc.

The design provides:

1. A method and a system to learn a vehicle's access control system to a server with two use case solutions including i) a retrofit solution to add valid IDs of additional remote entry key devices into the memory of a vehicle access circuit and registering that as a new valid ID with the vehicle access circuit and ii) an original equipment manufacturing (OE) solution where additional valid remote valid IDs of additional remote entry key devices are loaded into the memory of a vehicle access circuit and registered as valid IDs with the vehicle access circuit:

a. Retrofit solution: A method and a system for programming additional keys to existing vehicles in the market, which allow to synchronize key credentials between the vehicle and a server by means of a Learning Device.

b. OE solution: A method and a system for pre-programming additional remote entry keys, in addition to the typical amount of vehicle's pair of remote entry keys, programmed into the memory of the vehicle's access control circuit when being manufactured, which allow to synchronize key credentials between the vehicle and a server at a later point in time. Thus, the additional remote entry key credentials can be retrieved and used at a later point in time without having to go through a triggering process to learn these credentials in the learning process.

2. A method and a system to control access to a vehicle consisting of at least one RF signal transmitter communicating with the vehicle and a smartphone and/or backend server. The system emulates the communication between a regular RKE or PASE key device and a vehicle in such a way that it is identical to a regular key that is programmed to the vehicle.

a. Backend telegram generation: In this embodiment, the software code which calculates corresponding RKE messages (in the following referred to as "telegrams") expected by the vehicle RF receiver runs on a backend server that communicates directly or via a smartphone with the RF signal transmitter that generates the corresponding electromagnetic RF signal.

b. Local telegram generation: In this embodiment the software code which calculates corresponding RKE telegrams expected by the vehicle RF receiver is received as a software executable package that runs either on a smartphone or the RF signal transmitter that generates the corresponding electromagnetic RF signal. The executable software code required on the smartphone or the RF signal transmitter may be deployed via a backend server.

A Explanation of terms used to further describe methods and systems 1a, 1b, 2a and 2b:

Remote Key Entry (RKE) Protocol: A specification of a telegram structure (a sequential order and meaning of data bytes), message flow, encryption algorithms and physical properties of the electromagnetic signal such as center frequency, modulation, bitrate, etc. Protocols are specific to vehicle models. They may be used over a range of different models within one brand.

PASE Protocol: Like the above, but for PASE systems. Comprising specification for bidirectional message flow both on RF and LF wavelengths.

Immobilizer Protocol: Like the above, but for Immobilizer circuitry in a vehicle. Comprising specification for bidirectional message flow on LF wavelengths.

Learning Procedure: A communication sequence that is used to program valid key IDs into that particular vehicle. The Learning Procedure usually commences with an initiation of a programming session via a triggering step. This may be triggered by pushing buttons or using actuators in the vehicle in a defined sequence, which differs for different makes and models of vehicles. It may also involve communication over a diagnostic tester with the vehicle including authorization by PIN or other security means. After the programming session is initiated with the trigger, then the next step is the specific sequence flow of messages that allows key credentials to be exchanged and synchronized. Data channels used for this communication may be RF, LF, the diagnostic port or any combination thereof. The learning procedure for valid key IDs in the factory may be the same or different as the learning procedure used in the field (e.g. at dealerships).

Key Credentials: Key credentials are used as input parameters when calculating telegrams according to a protocol. They typically comprise a serial number of the key, a secret key used for encryption, a manufacturer ID and a rolling code counter. Key credentials allow to program specific valid key IDs to individual access control circuits located in a vehicle. During the learning procedure key credentials are typically stored in one of: A control unit in the vehicle which authorizes commands received from a key; in the key device itself; or in a database used by the OEM to track keys programmed to vehicles.

Some example stable carrier wavelength frequencies:
LF: Low Frequency, typically 125 Khz . . . 135 kHz
RF: Radio Frequency. Here are some ISM bands, typically 315 MHz, 434 MHz, 868 MHz, 902 MHz 1. Two or more methods and systems (1a and 1b below) are discussed to learn and then pair to a pre-installed access control system including its particular authentication code for a particular vehicle by a remote backend server or handheld computer device (smartphone) exchanging communications with a pre-installed access control system in that vehicle.

1a: A method and a system for programming additional key IDs to existing vehicles in the field, which allow to synchronize key credentials between the vehicle and a server.

This system requires the backend server cooperate with remote handheld computing device to act as a "Learning Device". The Learning Device is required only once to perform the initial synchronization between the vehicle and the server. The Learning Device hardware has a functional super set of the majority of the learning procedures for all existing key devices in one market plus an additional interface to communicate with a server. The latter will typically be realized as an interface to communicate with a remote handheld computing device such as an app on a smartphone, which then communicates with a backend server. The Learning Device incorporates all required hardware components to communicate with the vehicle during learning, namely:

Configurable RF transmitter supporting multiple frequencies, modulation types etc.: Sends outs telegrams to the vehicle RF receiver. The handheld RF signal transmitter has one or more ASICs to be highly configurable in generating a set of two or more stable RF signals at different frequency wavelengths, which is remote controlled by the software commands in the access control telegram message issued from a backend server.

LF 3D receiver & transponder: Receives telegrams sent from the vehicle's LF PASE antennas and the immobilizer coil. It sends data to the immobilizer coil. The handheld RF signal transmitter may also have a LF transponder to communicate with an immobilization circuit in the vehicle.

Optional onboard immobilizer encryption engine supporting multiple encryptions standards.

Method:

Step 1: A programming session is initiated and the Learning Device is programmed to the vehicle in accordance to the learning procedures implemented in the vehicle. Note, the learning procedures are the same for all vehicles of the same make and model.

The database cooperating with the backend server is configured with a plurality of programming/learning key procedures. The database contains a set of numerous programming/learning key procedures and their corresponding particulars for the superset of the learning procedures in the market. The message flow as well as the data telegrams can be controlled via the server. For this purpose the backend server accesses a database that contains the vehicle model specific protocol descriptors. Further, the database contains the corresponding messaging sequence for programming additional keys to the vehicle. The Learning Device configures its LF and RF interfaces as well as the optional immobilizer encryption engine according to the protocol descriptor.

Step 2: After the key credentials for that particular vehicle have been synchronized between the Learning Device and the vehicle in step 1, the Learning Device transmits these credentials to the backend server, which stores them in a database.

Once the initial synchronization has taken place via 1a or 1b, then a system to control access to a vehicle described in 2a and 2b may be used indefinitely.

1b: A method and a system for pre-programming additional keys to vehicles when being manufactured, which allow to synchronize key credentials between the vehicle and a server at a later point in time.

Other than the system to learn existing vehicles in the field to a server, this system does not require any additional device. It requires the manufacturer of the vehicle to pre-program key credentials for additional keys, which may be activated at a later point in the vehicle's lifetime. Alternatively the manufacturer may also realize this mechanism by allowing to program key credentials into a vehicle via the diagnostic interface without any data exchange over the vehicle's RF or LF interfaces.

Method:

Step 1: When the vehicle is manufactured typically with two key device IDs that are programmed into the memory of vehicle, which are sold together with the vehicle. In addition to those two IDs for the physical key fob devices, the manufacturer programs additional virtual key IDs with their corresponding credentials into the vehicle. The credentials of such virtual key IDs may be stored in a separate database than those that are sold with the vehicle. One or more of these additional key device IDs stored in the backend database may then be, via the server, assigned and imprinted into a device such as the user's smart phone, when a user registers with the server in step 2.

Step 2: When the vehicle owner signs up for a service requiring granting access control to others or when he wants to use an alternative device such as a smartphone the service provider communicates with the manufacturers database for virtual key credentials. Subsequently those key credentials are synchronized with a database that the service provider manages.

Note, once the initial synchronization has taken place in methods 1a or 1b, then a system to control access to a vehicle described in 2a and 2b may be used indefinitely.

2. Two or more methods and systems (2a and 2b below) are discussed to control at least access to a vehicle from a backend server sending an access control telegram to a local client device, which establishes communication with the RF access control module in the vehicle.

2a: A method and a system to control access to a vehicle consisting of at least one RF signal transmitter communicating with the vehicle and a smartphone and/or backend server. The system emulates the communication between a regular RKE or PASE key device and a vehicle in such a way that it is identical to a regular key fob that is programmed to the vehicle.

Backend telegram generation: In this embodiment, the executable software code which calculates corresponding RKE messages (in the following referred to as "telegrams") expected by the vehicle RF receiver runs on routines in a backend server which communicates either i) directly with or ii) via a smartphone with the RF signal transmitter component of the design that generates the corresponding electromagnetic RF signal. The backend server can handle different protocols that match specific vehicle models in particular markets. For this purpose, the backend server is connected to one or more databases that contain the required protocol descriptors. In order to address individual vehicles, the backend server is connected to a database that contains the individual vehicle key credentials, which may be obtained by methods described in 1a or 1b. Each user's vehicle(s) can be registered with their particulars in the backend cloud site.

A person/user who wants to send a command to a vehicle needs to be in possession of a handheld device like a smartphone that runs an application that has been registered with the backend server. The handheld computing device is configured to serve at least two purposes:

Communicate with the backend server to request the execution of a command, e.g. unlocking of a specific vehicle Communicate with the RF signal transmitter component of the design which must be located in a way that the RF signal emitted by the signal transmitter reaches the RF receiver installed in the vehicle.

The RF signal transmitter hardware has a functional super set of the RF portion of all existing key fobs in one market plus an additional interface to communicate to a handheld device like a smartphone. The RF signal transmitter component of the design may be a separate device or mechanically integrated into the handheld device. If start authorization is a required feature, the RF signal transmitter will typically also have the LF hardware components to communicate with the vehicle's LF immobilizer and receive data from the vehicle's LF transmitter. From a hardware perspective, the RF signal transmitter may be identical to the RF signal transmitter in the Learning Device described in 1a.

Method:

Step 1: The user requests the execution of a command, e.g., unlocking of the vehicle, by using the user interface of his handheld device. The handheld device identifies itself when communicating with the backend server in a conventional well known and secure fashion.

By accessing vehicle specific key credential data and corresponding protocol descriptors from a database, the backend server can calculate matching telegrams for individual vehicles. For RKE commands this typically means to assemble a telegram which contains a synchronization word, an individual key ID number, an action code (such as unlock doors), a rolling code counter and/or additional encrypted authentication code. The backend server sends the telegram together with the protocol descriptor to the RF signal transmitter.

Step 2: The RF signal transmitter configures the RF interface in accordance with the signaling parameters contained in the protocol descriptor. Subsequently, the RF signal transmitter sends out the telegram to the receiver circuit in the vehicle which in turn executes the commands. In essence, the RF signal transmitter relays telegrams generated by the backend to the vehicle.

Optionally, the RF signal transmitter may also configure the optional LF interface, receive and decipher LF messages from the vehicle and send LF or RF signals in return.

2b: A method and a system to control access to a vehicle including i) at least one RF signal transmitter communicating with the vehicle, ii) a hand held computing device such as a smartphone, and/or iii) a backend cloud site with a server and databases. The system emulates the communication between a regular RKE or PASE key fob device and a RF receiver circuit installed in a vehicle in such a way that it is identical to a regular key that is programmed to the vehicle.

Local telegram generation: In this embodiment the executable software code which calculates corresponding RKE telegrams expected by the vehicle RF receiver runs either i) on a smartphone or ii) on the RF signal transmitter that generates the corresponding electromagnetic RF signal. The executable software code required on the smartphone or the RF signal transmitter may be deployed via a backend server. The backend server can provision software code that is tailored to individual vehicles by accessing a database with vehicle model specific protocol descriptors and a database with individual vehicle key credentials, which may be obtained by methods similar to those described in 1a or 1b.

The RF signal transmitter hardware has a functional super set of the RF portion of all existing key fobs in one market plus an additional interface to communicate to a handheld device like a smartphone. The RF signal transmitter may be a separate device or mechanically integrated into the handheld device. If start authorization is a required feature the RF signal transmitter will typically also require the LF hardware components to communicate with the vehicle's LF immobilizer and receive data from the vehicle's LF transmitter. From a hardware perspective, the RF signal transmitter may be identical to the Learning Device described in 1a.

Method:

Step 1: After registration to the service and initial synchronization of key credentials like described in 1a or 1b, the user receives an individually tailored software package from a backend server to be installed on his handheld device or RF signal transmitter. The software package is able to calculate telegrams for the individual vehicle of the user. Key credentials may be securely stored within the software or in a dedicated memory/secure element such as a SIM card.

Step 2: The user requests the execution of a command, e.g., unlocking of the vehicle, by using the user interface of his handheld device. The server either sends the telegram or has previously sent an executable software package to the handheld device or the RF signal transmitter. The software on the handheld device or the RF signal transmitter subsequently calculates matching telegrams with the particulars for the individual vehicle. For RKE commands, this typically means to assemble a telegram which contains a synchronization word, an individual key ID number, an action code (such as unlock doors), a rolling code counter and/or additional encrypted authentication code.

Step 3: The RF signal transmitter configures the RF interface in accordance with the signaling parameters contained in the protocol descriptor. Subsequently, the RF signal transmitter sends out the telegram to the receiver circuit in the vehicle which in turn executes the commands.

Optionally, the RF signal transmitter may also configure the optional LF interface, receive and decipher LF messages from the vehicle and send LF or RF signals in return.

Depending on the use case there are a variety of deployment scenarios.

I) Package Deliveries into Vehicles by Authorized Delivery Carriers:

In this scenario, a vehicle owner signs up for a service to get packages delivered into his vehicle. The user may set up the service by having the backend server learn the key ID particulars of the user's vehicle via method 1a or 1b. The delivery carrier will use two devices:

The standard portable device with the ability to scan barcodes on packages, a user interface and means to communicate with a logistics backend server.

A dedicated RF signal transmitter which communicates with the standard portable device and its corresponding application, and via the application with the Remote Access service provider's backend server.

Method 2a is used to unlock and lock different vehicles. See FIG. 1 for an example distribution of the distinct components making up this embodiment of the design.

II) Car Sharing/Rental Car Fleets with Standard Smartphones:

In this scenario, the RF signal transmitter is a mechanically separate device from the smartphone and installed inside of the vehicle. For example, the RF signal transmitter may be part of an OBD dongle that is retrofitted to the vehicle. A user communicates via a standard interface such as Bluetooth or Wi-Fi of his smartphone with the RF signal transmitter. The RF transmitter is installed inside of the vehicle and an app on the handheld computing device is configured to exchange communications with the RF transmitter is installed inside of the vehicle to access/open and/or unlock the vehicle.

Method 2a or 2b is used to access and optionally operate the vehicle. In a particular simple embodiment, the system is merely used to gain access to the vehicle, i.e. unlock and lock the doors. A regular car key is then used for operating the vehicle and the regular car key is left inside. See FIG. 2 for an example distribution of the distinct components making up this embodiment of the design.

Figure 7:
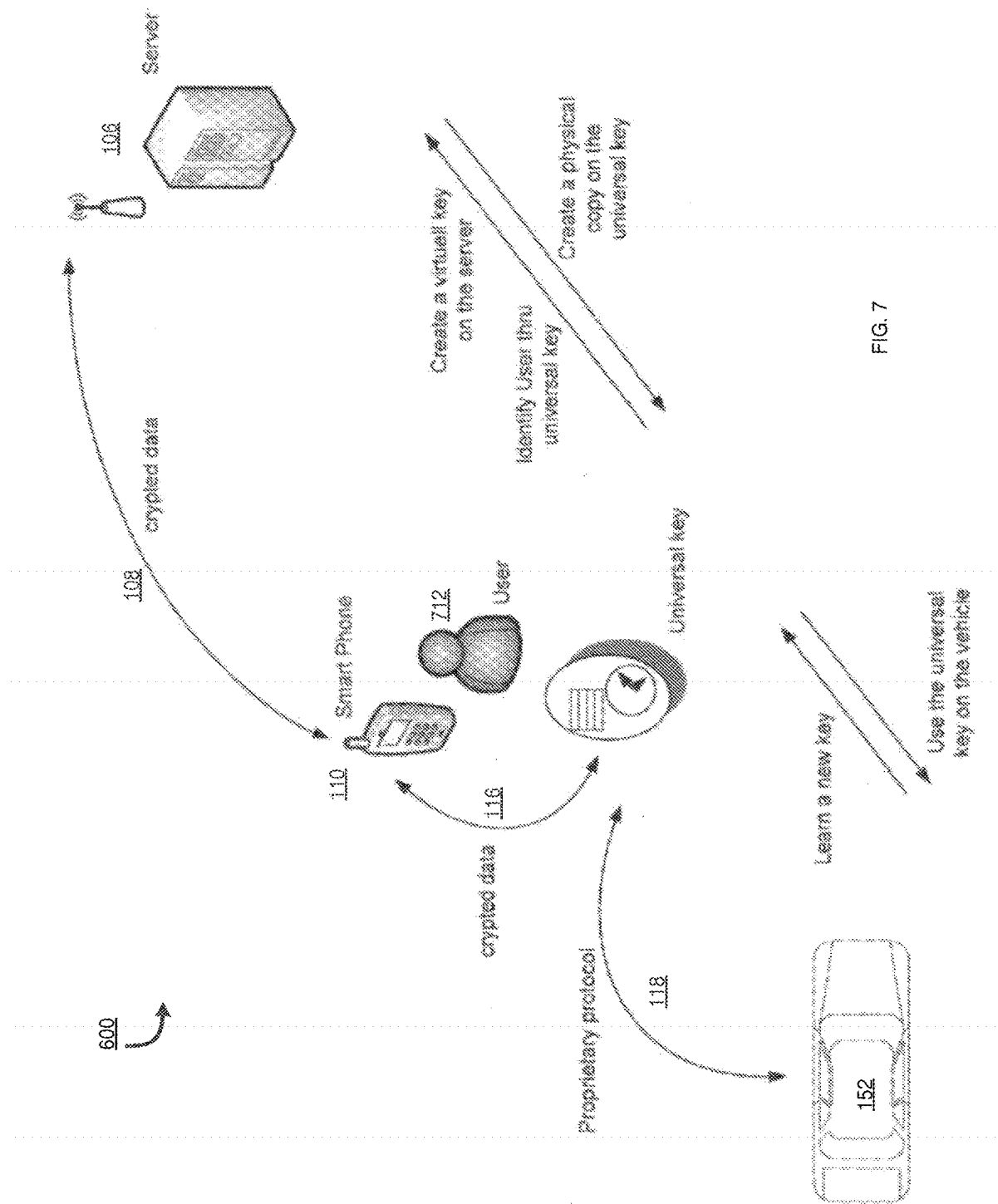
FIG. 7 for an example remote key fob simulator use case.

Next, See FIG. 7 for an example remote key fob simulator use case. Vehicles possess specific proprietary protocols and interfaces for unlocking (opening) and starting up; and vehicles also have a limited number of registered key IDs (usually two) delivered with the vehicle and also only a limited number of slots in the memory to register additional learned valid key IDs (usually the max. number of all valid key IDS is 8). This may be a problem with a growing number of users such as at e.g. in corporate vehicle fleets, rental car fleets, or in the car sharing application services. The user is sent a key fob simulator (such as a smart phone application. The application may have protocols to access multiple vehicles in general or may simply communicate with the backend server to obtain the protocol procedure for a given vehicle and manufacturer. A key fob is learned to a specific vehicle (including immobilizer key credential secrets) over the air by a communication, which is encrypted between this key fob device simulator and the backbone cloud site (the smart phone or other devices only as plain interfaces). The vehicle key credential secrets are communicated and learned as previously described. The fob device simulator has stand alone functionality of, at least, being able to access a vehicle and (optionally) an internal timer, which makes it useless after a while (until it is learned again to the same or another vehicle). The timeout is handled by the universal key fob (like number of authentications, duration of use, etc., and may be implemented by simple countdown timer cooperating with software). The software will delete the vehicle's unique key credentials when the timer expires. Secrets are also erased when tampering attempts (for example, if the clock stopped or reset) Here, the end user carries a personalized key fob and uses it for different vehicles (use case: car sharing, the user always carries his personal fob with him). The universal fob owned and carried by a car sharing user, and optionally used for user identification. The backend server can store individually the individual key credentials for each vehicle or at least the set of protocols to learn the individual key credentials for each vehicle. End-to-end encryption occurs between the universal fob and the server (for learning and for normal access use). In a further embodiment, several virtual Keys are generated per vehicle at the same time in order to allow more users make simultaneous operation of the vehicle. In another configuration, the Key is given limited rights, for example, only vehicle access, only access door but no trunk, only trunk access, etc.

Again, Vehicles possess specific proprietary protocols and interfaces for unlocking (opening) and starting up; and vehicles also have a limited number of registered key IDs (usually two) delivered with the vehicle and also only a limited number of slots in the memory to register additional learned valid key IDs (usually the max. number of all valid key IDS is 8). This may be a problem with a growing number of users such as at e.g. in corporate vehicle fleets, rental car fleets, or in the car sharing application services.

Figure 8:
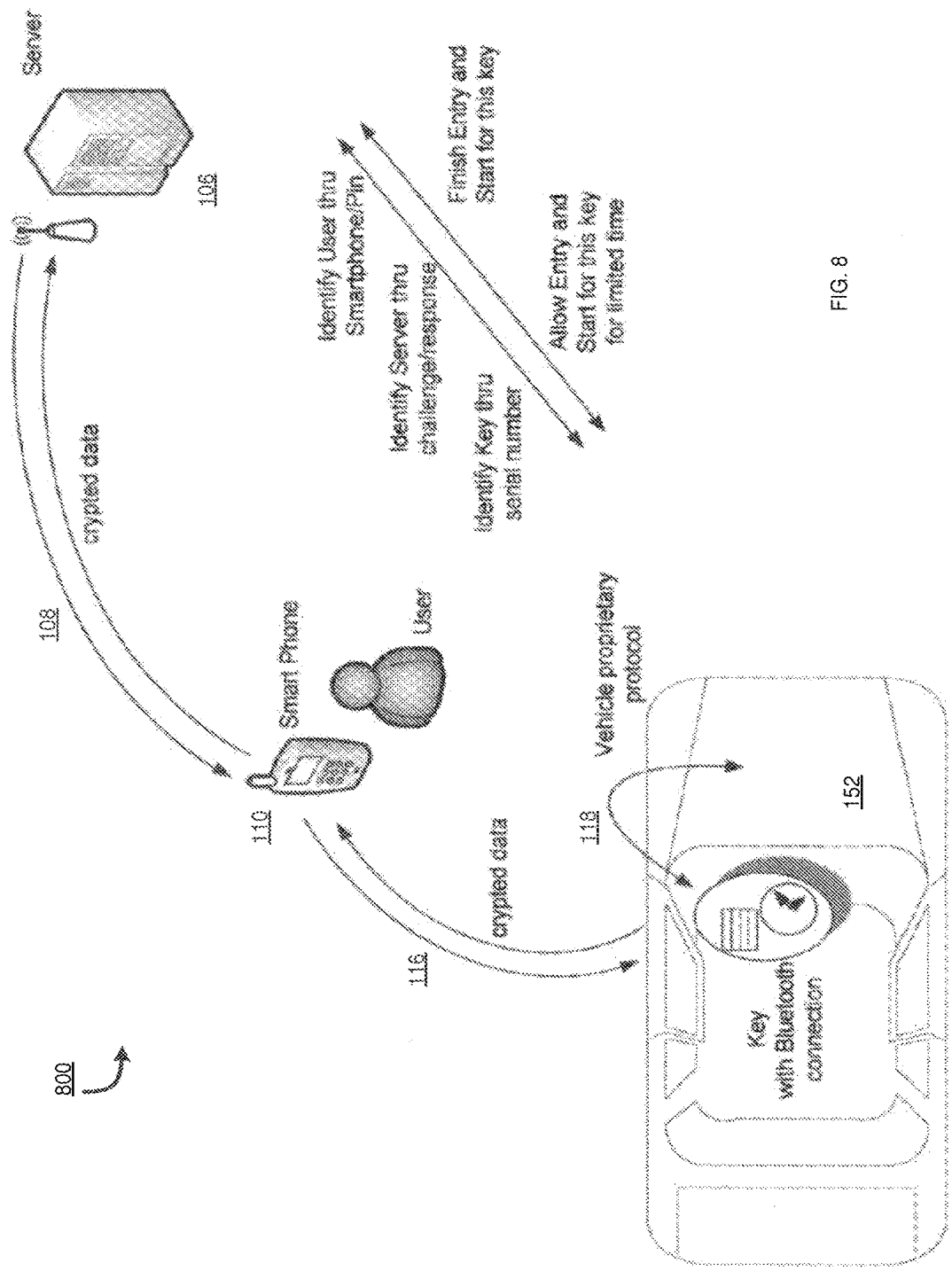
FIG. 8 illustrates an embodiment of an example use case.

See FIG. 8 for an example use case. Instead of an additional electronics circuit, which is connected electrically in the vehicle 152, there remains a special key simulator installed in the vehicle, which is taught to the vehicle, but can only be activated by communication with the backend server. A key fob is learned to the car (including immobilizer key credential secrets) once, but this special key fob simulator device is connected to the backbone (the smart phone or other devices only as plain interfaces), which can enable it for a while. The backbone cloud site does not get the vehicle access secrets, these remain with the key fob simulator device. This Key can only be used when the upper Bluetooth interface contained in it is unlocked. The activation takes the cellular connection of the smartphone to a downstream server. For this, the Key has an additional secret that is only known to the installed special key and the downstream server. As authentication, some example methods include use of a Challenge Response procedure, where the Key sends the Challenge and the server responds. This authentication also requires a previous or parallel user authentication in order to have ensured that access to the vehicle is preserved only the correct user. The user may authenticate by means of its smart phone to the server. The user has a special app enabled, giving it a pin for A Bluetooth connection. With a second device (e.g. smart phone) the car user can connect to the backbone cloud site and collect the information for enabling the device. With this, the user can remotely transmit open and close messages thru the key fob simulator device and enable the immobilization circuits in the vehicle to allow the vehicle to start and move. Here, the end user connects to the backbone with his e.g. smart phone device and gets a temporarily permit to use the special key fob simulator, which remains (the whole life) inside the car (use case: remote car rental and for car sharing). End-to-end encryption occurs between the universal fob and the server (for learning and for normal access use).

Use Case a) PASE vehicle: The new user pulls the door handle. The vehicle starts a PASE query. This arouses the software on the special key fob simulator. The key answers the PASE question potentially in the negative, and enables its Bluetooth interface.

Use Case b) vehicle RKE

The key has to be Bluetooth-Interface in Advertising Mode. The new user now connects his smartphone via Bluetooth with the special key. For this, the device uses the backend server to provide an appropriate Pin number. After coupling, the authentication of the server is performed with the special key. To perform this successfully as the Key is unlocked and the vehicle will automatically send a corresponding command to unlock via the smartphone. This release is always through an opening command. The special key awaits transfer of the pin number. The server transfers the user's device the pin. An activation of the special key occurs. A Bluetooth connection to the phone is established and then communication via a cellular connection to the server occurs. After a successful acknowledgment by the server, then the Bluetooth pairing is canceled for Smartphone and the key returns back into hibernation. The key is programmed to understand and perform the vehicle-specific radio and transponder protocol.

III) Smartphone Integration:

In this scenario, the RF signal transmitter is integrated into a handheld smartphone. Such a device may then be used for any of the above use cases.

See FIG. 3 for an example distribution of the distinct components making up this embodiment of the design.

FIGS. 5-6 illustrate block diagrams of embodiments of the remote access to a vehicle service hosted on a cloud-based provider site. The web server farm 270 may have examples of 4 servers and 2 database clusters 275. A user may download and use a remote access to a vehicle mobile application to register with the remote access to a vehicle service cloud system. The cloud-based remote access to a vehicle service hosted on a cloud-based provider site contains one or more servers and one or more databases. The one or more databases store at least i) User ID and Password for the remote access to a vehicle service, ii) User name, iii) email or contact phone number of the user, iv) Security questions, v) Vehicle VIN, vi) Vehicle make, model, color, year, and vii) any combination of at least three of these.

The cloud-based remote access to a vehicle service can be implemented in software, hardware electronics, and any combination of both and when one or more portions of the system are implemented in software, then that software is tangibly stored in an executable format on the one or more non-transitory storage mediums to be executed by a processing component.

Additional hardware may be installed in the target vehicle to assist in the remote access to a vehicle process. A dongle may be a small piece of hardware that attaches to the vehicle in order to enable additional functions.

i) Registration and purchase: There are multiple time periods and methods a customer can select to register with the remote access to the vehicle service. Upon registering, a first database in the one or more databases may be also configured to contain and index information regarding for each user including: User ID and password for the remote access to a vehicle service, User name, email, etc., security questions, vehicle VIN, vehicle model, color and year, and other similar information. An application on the handheld computer device that is used by a user of the remote access to the vehicle service can be downloaded from a website associated with the remote access to the vehicle service.

1) When purchasing a new car at the dealership with a telematics system built into the vehicle the following steps are performed: i) the customer is offered to sign-up for the remote access to a vehicle service, ii) the customer signs up for the Box2Go service application in the cloud-based remote access to a vehicle service using a paper form and the customer downloads the Box2Go mobile app into their client device, iii) the customer logs-in to the Box2Go mobile app at least once to activate the Box2Go service application in the cloud-based remote access to a vehicle service; and other similar ways to register to become a user.

Figure 9:
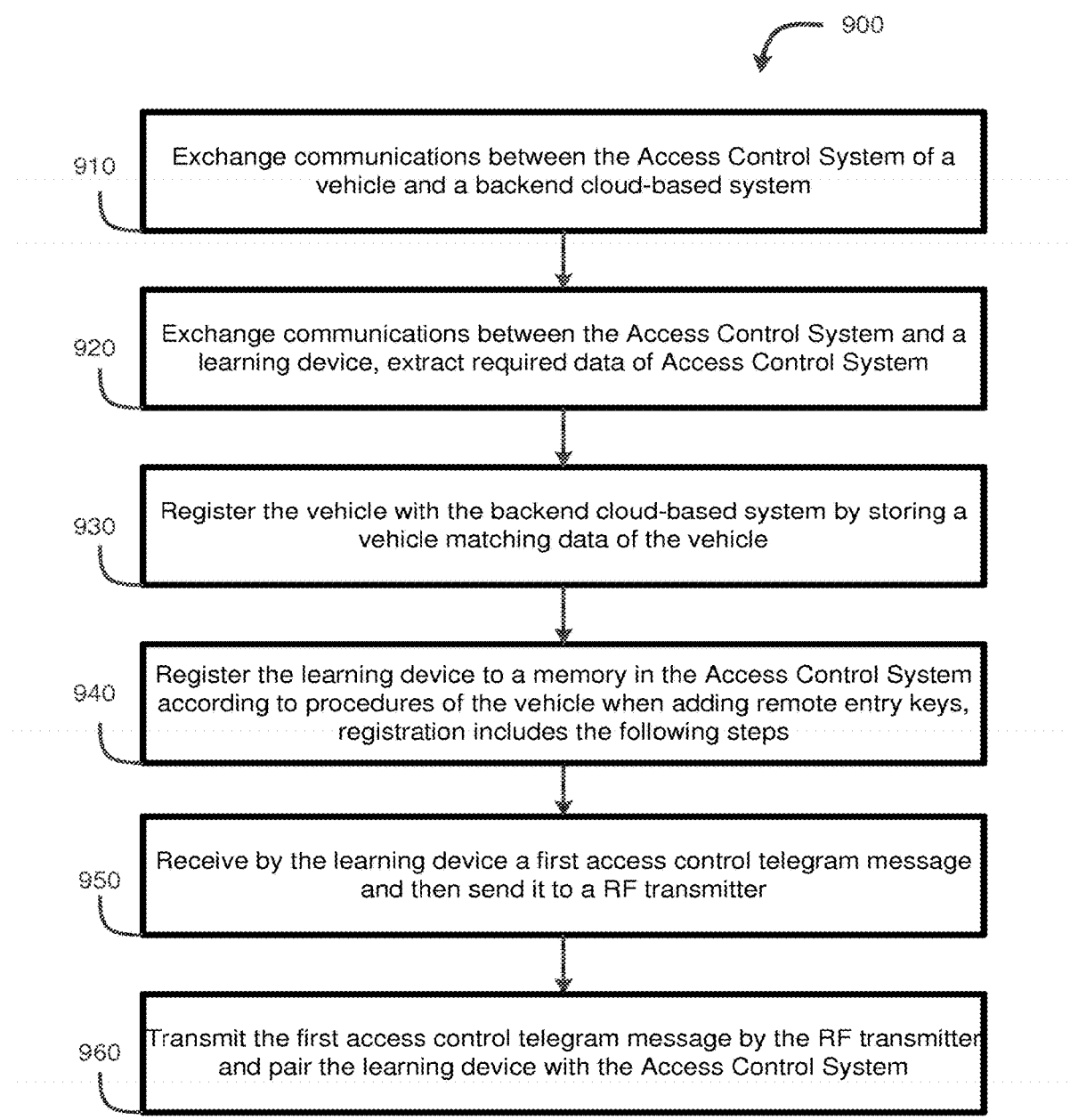
FIG. 9 illustrates a flow graph of an example method to learn and then pair to a pre-installed access control system of a vehicle.

FIG. 9 illustrates a flow graph of an example method to learn and then pair to a pre-installed access control system of a vehicle. Communication can be exchanged between the pre-installed access control system in that vehicle and a backend cloud-based system having one or more servers running on a first group of one or more processors (910). As shown in FIG. 1, communication can be exchanged between a learning device 120 of a client device 130 through connections 132 and 134 to the access control system 125 in vehicle 152. Then communication can be exchange directly between the learning device 120 of the client device 130 and backend cloud-based server 106. Alternatively, communication can be exchanged between the learning device 120 of the client device 130 and a handheld computer device 110 and then from the handheld computer device 110 to the backend cloud-based server 106. In an example, Bluetooth or Wi-Fi communication can be used between the learning device 120 and access control system 125.

Communication can be exchanged between the access control system and a learning device to extract required data of access control system (920). The communications exchange between the pre-installed access control system 125 in vehicle 152 and the learning device 120 can be performed once to extract any required data for the access control system. The required data for the access control system include a particular authentication code of the vehicle 152. The pre-installed access control system 125 in vehicle 152 can have one or more receiving devices and a controller that manages key credentials.

The vehicle can be registered with the backend cloud-based system by storing a vehicle matching data of the vehicle (930). The registration of the vehicle 152 with the backend cloud-based system 140 can be performed by sending a set of vehicle matching data to the backend cloud-based system 140 and then storing the vehicle matching data in a database 102 associated with the backend cloud-based system 140. The stored vehicle matching data can be used by a first routine that can run on the processors of the servers 106 of the backend cloud-based system 140 to obtain and send a first access control telegram message of the vehicle 106 to the learning device. In an example, the vehicle matching data can include Make and Model of the vehicle and can be used to obtain an access control telegram message based on Make and Model of the vehicle. Additionally, the vehicle matching data may include a Vehicle Identification Number (VIN) and VIN may be used for obtaining an access control telegram message. In another example, the vehicle matching data may include a user ID and a database of the backend cloud-based system may include a list of registered users and their associated vehicles including Make and Model and/or VIN. The access control telegram message can be obtained through retrieving Make and Model and/or VIN of the user's vehicle via the user ID.

The learning device can be registered to a memory in the access control system according to procedures of the vehicle when adding remote entry keys (940). The registration of the learning device 120 to memory 126 of the access control system 125 can facilitate a key like simulator and can be performed as an additional remote entry key of the pre-installed access control system 125 of the vehicle 152. The learning device 120 can be coupled to a Radio Frequency signal transmitter 114. The RF signal transmitter 114 can be used for transmitting RF signals to a Radio Frequency receiver 112 associated with the access control system 125 of a vehicle 152. The RF signal transmitter 114 can have Application-Specific Integrated Circuits (ASICs) that can be to be highly configurable in generating multiple stable RF signals at multiple frequency wavelengths. The registration includes the following steps.

The learning device can receive a first access control telegram message and then send the first access control telegram message to a Radio Frequency transmitter (950). The learning device 120 can receive from the backend cloud-bases system 140, a first access control telegram message associated with the vehicle matching data of the vehicle 152 along with a first set of signaling parameters associated with the RF signal corresponding to a Radio Frequency receiver 112 of the access control system 125 of a vehicle 152. The first access control telegram message can include a sequence of identification and authorization steps to emulate registering procedures matching the requirements of the vehicle 152. The first access control telegram message can include the specific frequency wavelengths of the RF receiver 112 of access control system and can be used to register the additional remote entry key in the access control system 125 of the vehicle 152. The first access control telegram message is then sent to the RF signal transmitter 114.

The RF transmitter can transmit the first access control telegram message and then can pair the learning device with the access control system (960). The first access control telegram message including the sequence of identification and authorization steps can be transmitted by the RF signal transmitter 114 to the pre-installed access control system 125 of the vehicle 152. The transmitted RF signals are characterized by the first set of signaling parameters that emulate registering procedures matching the requirements of the vehicle 152 including the specific frequency wavelengths and expected protocol exchanges for the access control system 125. Then the learning device 120 can be paired with the pre-installed access control system 125 of the vehicle 152 in accordance with the learning procedures implemented in the vehicle 152. The pairing can include registering an ID of the additional remote entry key with the memory 126 in the pre-installed access control system 125.

In an embodiment, the vehicle matching data can include a Make and Model of the vehicle. The backend cloud-based system can use the vehicle matching data to obtain an access control telegram message. In an example, the vehicle matching data can include one or more of i) a Make and Model of the vehicle associated with a user, ii) a user ID corresponding to the user associated with the vehicle, and iii) a Vehicle Identification Number (VIN) of the vehicle associated with the use. Also, obtaining the access control telegram message can be based on one of the Make and Model of the vehicle, the user ID corresponding to the user of the vehicle, or the Vehicle Identification Number of the vehicle.

In an embodiment, after pairing, the learning device 120 can transmit the additional remote entry key credentials corresponding to the learning device 120 to the backend cloud-based system. The key credentials corresponding to the learning device 120 can be stored in a database associated with the backend cloud-based system 140. In an example, transmitting the additional remote entry key credentials can happen in a subsequent point of time after pairing. In an example, the additional remote entry key credentials may include the vehicle matching data, and ID of the additional remote entry key, and a valid authentication key of the additional remote entry key.

In an embodiment, after the pairing and in a subsequent point of time, the RF signal transmitter 114 can receive a second access control telegram message from the backend cloud-based system 140. The second access control telegram message can include a second authentication key and a second set of signaling parameters and can have one or more actuation commands. The second access control telegram message can be obtained based on the additional remote entry key credentials of the learning device. The actuation commands can include unlocking doors, opening windows, opening trunks, closing trunks, turning engine on, turning engine off, opening and closing a sunroof or moon roof. In an example, after paring the learning device 120 is bypassed and the RF signal transmitter can directly receive communication from the backend cloud-based system 140 or the handheld computer device 110.

Additionally, the RF signal transmitter 114 can transmit the actuation commands and the second authentication key to the pre-installed access control system 125 of the vehicle 152. Also, a controller of the access control system 125 can grant access upon successful authentication of the second authentication key and then the actuation commands can be executed and cause a corresponding electro mechanical operation in the vehicle.

In an embodiment, the RF signal transmitter 114 can receive a third authentication key and a third access control telegram message based on a specific vehicle matching data for a specific vehicle from among access control telegram messages of vehicles with different Make and Model. The third authentication key and the third access control telegram message can be received either directly from the backend cloud-based system to the RF signal transmitter 114. The third authentication key and third access control telegram message can be obtained by a first module that can execute on the one or more processors associated with the servers of the backend cloud-based system 140. Alternatively, the third authentication key and the third access control telegram message can be received directly from the handheld computer device 110 to the RF signal transmitter 114. The third authentication key and third access control telegram message can be obtained by a second module that can execute an executable software package on one or more processors associated with the handheld computer device 110. The executable software package can be received by the handheld computer device 110 from the backend cloud-based system 140.

In an embodiment, the RF transmitter 114 can either be i) located in the handheld computer device; ii) located as an attached device cooperating with the handheld computer device; or iii) located inside the vehicle. The RF signal transmitter 114 can transmit an access control telegram message and an authentication key via an electromagnetic signal to the RF receiving circuit 112 associated with the access control system 125 originally installed in the vehicle 152. The electromagnetic signal can be characterized by a set of the signaling parameters according to the requirements of the RF receiving circuit 112.

In an embodiment, the RF signal transmitter 114 can be either included in the learning device, or can be coupled to the learning device. The learning device 120 can use either wired communication, or wireless communication including Bluetooth, Wi-Fi, and NFC to communicate with the RF signal transmitter 114.

In an embodiment, a cloud-based system for granting vehicle access can include one or more cloud based servers that can have of one or more processors. The servers can cooperate with one or more cloud based databases.

Also, the cloud-based system for granting vehicle access can include a set of different access control telegram messages in the one or more databases. The set of different access control telegram messages can include access control telegram messages corresponding to key fobs in the market such as a first key fob of a first vehicle from a first vehicle manufacture and a second key fob of a second vehicle from a second vehicle manufacture. The databases store a set of different key protocols for the current already existing protocols in the set of potential keys fob in the market. A different protocol exists between a first vehicle from a first vehicle manufacture and a second vehicle from a second vehicle manufacture and the databases store all of these protocols. The server is configured to select the appropriate protocol from the set of database based on referencing the data stored in the system for the vehicle associated for the user requesting to either to 1) learn the new key ID device and register that to new key ID device to a particular vehicle or 2) request remote access to open and/or unlock the particular vehicle associated for the user.

Additionally, the cloud-based system for granting vehicle access can have a module that can execute on the processors of the cloud based servers. In response to receiving a vehicle matching data of a vehicle associated with a user, the module can obtain an access control telegram message from the set of different access control telegram messages in the databases. Obtaining the access control telegram message can be based on referencing the vehicle matching data of the vehicle associated with the user with the access control telegram message. The referencing can be according to one of requested actions i) to emulate registering procedures matching requirements of the vehicle to learn a new authentication key and to register that new authentication key to the vehicle associated with the user, or ii) to request remote access, for example, to open and/or to unlock the vehicle associated with the user.

In an embodiment, the communication between the learning device 120 and the backend cloud-based system 140 can be through the handheld computer device 110. In an example, the handheld computer device can be a smart phone. Also, Wireless cellular communication can be used between the backend cloud-based system 140 and the handheld computer device 110 and Bluetooth or Wi-Fi communication can be used between the handheld computer device 110 and the learning device 120.

In an embodiment, a system can learn and then pair to a pre-installed access control system including its particular authentication code for a particular vehicle. The vehicle's particulars can be learned and then paired by a remote backend server or by a handheld computer device (smartphone) by exchanging communications with the pre-installed access control system in that vehicle.

In an embodiment, a learning device can extract any required data for the access control system including its particular authentication code, one time, for the particular vehicle and then can register the particular vehicle in the backend cloud site. The vehicle can have receiving device(s) installed in the vehicle and a controller that manages key credentials. The registration process can include registering a key like learning device to a memory in the access control system in the vehicle in accordance to the procedures implemented in the vehicle when adding regular remote entry keys.

In an embodiment, the learning device can communicate with, or alternatively, can include a handheld computer device (smartphone) and/or remote backend server. The learning device can also communicate with a handheld RF signal transmitter that has one or more ASICs to be highly configurable in generating a set of two or more stable RF signals at different frequency wavelengths. The RF signal transmitter can be remotely controlled by the software commands that can be included in an access control telegram message issued from a backend server. The handheld RF signal transmitter may also have a LF transponder to communicate with an immobilization circuit in the vehicle.

In an embodiment, the learning device can transmit a vehicle matching data to the handheld computer device (smartphone) and/or the remote backend server. The vehicle matching data can be used to generate control messages and authentication code of the handheld computer device (smartphone) and/or the remote backend server.

In an embodiment, the handheld computer device (smartphone) and/or remote backend cloud-based server transmits signaling parameters and message flow to the learning device in order to emulate registering procedures matching the requirements of the vehicle. The parameters can include the specific frequency wavelengths of access control and specific frequency wavelengths for the immobilization systems of the vehicle.

In an embodiment, a system to control access to a vehicle from a backend cloud-based system can include a local client device. The client device can receive access control telegram messages from the server of the backend system. The client device can establish communication with the RF access control module in the vehicle. The vehicle can include a receiving device installed in the vehicle and a controller that grants access upon successful authentication. Also, the remote backend server can generate access control telegram messages and then can send the access control telegram messages either directly or as an executable software package to a local handheld computer device (such as a smartphone). In an example, the backend server can cooperate with one or more databases to generate valid access control telegram messages for vehicles of different models as well as for vehicles from two or more different vehicle manufactures. The backend server can also calculation a key authentication code particular for that unique vehicle with one or more processors either i) in the remote backend server when sent directly, or ii) in the handheld computer device (smartphone) when sent as an executable software package from the backend server to the handheld computer device. Then the handheld computer device can execute the software package to calculate the key authentication code.

Also, the local client device of the system to control access to a vehicle from a backend cloud-based system can transfer an access control telegram message and an authentication code together with signaling parameters to a handheld RF signal transmitter. The handheld RF signal transmitter can be located in the handheld computer device; can be located as an attached device cooperating with the handheld computer device; or can be located inside the vehicle. The handheld RF signal transmitter can transmit the access control telegram message and authentication code via an electromagnetic signal characterized by signaling parameters adapted for to the RF receiving circuit originally installed in the vehicle. The handheld RF signal transmitter has one or more ASICs to be highly configurable in generating a set of two or more stable RF signals at different frequency wavelengths. The handheld RF signal transmitter can be remotely controlled by the software commands in the access control telegram message issued from a backend server.

Revenue

The user/customer may pay an additional fee on a per vehicle access instance to use the remote access to a vehicle service. The user/customer may pay a monthly or yearly subscription fee for all vehicle accesses. The user/customer may pay on another usage case model. A revenue sharing agreement may be in place between the retailer, the vehicle access service, the service provider, and the OEM provider. The service provider may subsidize the vehicle accesses to increase volume, etc.

Computing System

FIG. 4 illustrates a block diagram of an example computing system that may be used in an embodiment of one or more of the servers, in-vehicle electronic modules, and client devices discussed herein. The computing system environment 400 is only one example of a suitable computing environment, such as a client device, server, in-vehicle electronic module, etc., and is not intended to suggest any limitation as to the scope of use or functionality of the design of the computing system 810. Neither should the computing environment 400 be interpreted as having any dependency or requirement relating to any one or combination of components illustrated in the exemplary operating environment 400.

With reference to FIG. 4, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 400. However, carrier waves would not fall into a computer readable medium. Communication media typically embodies computer readable instructions, data structures, other executable software, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 4 illustrates operating system 834, other executable software 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 4, provide storage of computer readable instructions, data structures, other executable software and other data for the computing system 810. In FIG. 1, for example, hard disk drive 841 is illustrated as storing operating system 844, other executable software 846, and program data 847. Note that these components can either be the same as or different from operating system 834, other executable software 836, and program data 837. Operating system 844, other executable software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, a built-in Wi-Fi circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle. The vehicle has hardware and software for networking between the clouds as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. A cellular phone with a software application can establish a connection with the vehicle's on-board diagnostic computer and/or other on-board intelligent control systems.

The system can interface with a client device, such as a mobile phone, with the on-board computing system in the vehicle. The on-board diagnostic computing device may monitor a set of operational characteristics of a vehicle and communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database.

At the point of communication negotiation, an application on the client device extracts position location from the vehicle's navigation system and transmits the response from the vehicle's navigation system and the location to a server ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc.) and wireless connection protocols (Bluetooth, NFC, Infrared . . . etc.). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

FIGS. 5-6 illustrate diagrams of a network environment in which the techniques described may be applied. The network environment 200 has a communications network 220 that connects server computing systems 204A through 204F, and at least one or more client computing systems 202A and 202C. As shown, there may be many server computing systems 204A through 204F and many client computing systems 202A and 202C connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the server computing systems 204A and 204-B, and the client computing systems 202A and 202B may be viewed as peer-to-peer if each such communicating device is capable of initiation and response to communication. Additionally, server computing systems 204A-204E also have circuitry and software to communication with each other across the network 220. One or more of the server computing systems 204A to 204F may be associated with a database such as, for example, the databases 206A to 206F. Each server may have one or more instances of a virtual server running on that physical server and multiple virtual instances may be implemented by the design. A firewall may be established between a client computing system 202A and the network 220 to protect data integrity on the client computing system 202A. Each server computing system 204A-204F may have one or more firewalls.

FIGS. 5 and 6 illustrate block diagrams of an embodiment of a cloud-based remote access to a vehicle service hosted on the cloud-based provider site that automates a service like a package delivery to and pick up from the vehicle process. The cloud-based remote access to a vehicle service is hosted on a cloud-based provider site that contains one or more servers and one or more databases.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability which can be achieved by cloning tasks onto multiple virtual machines at run-time to meet changing work demand. Load balancers distribute the work over the set of virtual machines. This process is transparent to the cloud user, who sees only a single access point.

The cloud-based remote access to a vehicle service is coded to utilize a protocol, such as Hypertext Transfer Protocol (HTTP), to engage in a request and response cycle with both a mobile device application resident on a client device as well as a web-browser application resident on the client device. The cloud-based remote access to a vehicle service has one or more routines to automate a package delivery to and pick up from the vehicle process. The cloud-based remote access to a vehicle service can be accessed by a mobile device, a desktop, a tablet device and other similar devices, anytime, anywhere. Thus, the cloud-based remote access to a vehicle service hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a vehicle service, and 5) combinations of these.

The cloud-based remote access to a vehicle service has one or more application programming interfaces (APIs) with two or more of the package delivery entity sites, such as FedEx, UPS, etc., as well as application programming interfaces with two or more of the OEM 'remote access/connectivity' systems, such as telematics system sites, such as OnStar, Lexus Linksys, Ford Sync, Uconnect, MBConnect, BMWConnect, etc. The remote access to a vehicle service may have additional APIs. The APIs may be a published standard for the connection to each OEM 'remote access/connectivity' system. The APIs may also be an open source API. One or more of the API's may be customized to closed/non-published APIs of a remote access/connectivity' site and/or package delivery entity site. The cloud-based remote access to a vehicle service is coded to establish a secure communication link between each package delivery entity site and the cloud provider site. The cloud-based remote access to a vehicle service is coded to establish a secure communication link between each telematics system site and the cloud provider site. The software service is coded to establish the secure communication link by creating a tunnel at the socket layer and encrypting any data while in transit between each package delivery entity sites and the provider site as well as to satisfy any additional authentication mechanisms required by the direct lending institution, including but not limited to IP address white listing and token based authentication.

In an embodiment, the server computing system 204 may include a server engine, a web page management component, a content management component and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 204A, causes the server computing system 204A to display windows and user interface screens on a portion of a media space, such as a web page. A user via a browser from the client computing system 200A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 202A or any equivalent thereof. For example, the client mobile computing system 202A may be a smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

Telematics System

The telematics system uses telecommunications, vehicular technologies, electrical sensors, instrumentation, and wireless communications modules to allow communication with between the cloud and a vehicle. The telematics system site sends, receives and stores information via a telematics module to affect control on objects in the vehicle. Telematics includes but is not limited to Global Positioning System technology integrated with computers and mobile communications technology in automotive navigation systems. Telematics also includes cloud-based interaction with an integrated hands-free cell phone system in the vehicle, wireless safety communication system in the vehicle, and automatic driving assistance systems.

A wireless communication circuit exchanges communication between the mobile client device and the vehicle. The wireless communication circuit executes instructions with the processor via a bus system. The wireless communication circuit can be configured to communicate to RF (radio frequency), satellites, cellular phones (analog or digital), Bluetooth® V, Wi-Fi, Infrared, Zigby, Local Area Networks (LAN), WLAN (Wireless Local Area Network), or other wireless communication configurations and standards. The wireless communication circuit allows the vehicle's intelligence systems such as the telematics module and other diagnostic tools to communicate with other devices wirelessly. The wireless communication circuit includes an antenna built therein and being housed within the housing or can be externally located on the housing.

The Telecommunications and Informatics applied in wireless technologies and computational systems may be based on 802.11p. The IEEE standard in the 802.11 family and also referred to as Wireless Access for the Vehicular Environment (WAVE), is the primary standard that addresses and enhances Intelligent Transportation System.

An example telematics module sends commands and exchanges information other electronic circuits, electromechanical devices, and electromagnetic devices in the vehicle. The telematics module may operate in conjunction with computer-controlled devices and radio transceivers to provide precision repeatability functions (such as in robotics artificial intelligence systems) and emergency warning performance systems located in and exchanged between vehicles.

Additional intelligent vehicle technologies are car safety systems and self-contained autonomous electromechanical sensors to generate warnings that can be transmitted within a specified targeted area of interest, say within 100 meters of the emergency warning system for vehicles transceiver. In ground applications, intelligent vehicle technologies are utilized for safety and commercial communications between vehicles or between a vehicle and a sensor along the road.

The wireless communication circuits in the vehicle or in a client device are configured to give access to the mobile Internet via a cellular telephone service provider. The mobile Internet is wireless access that handoffs the mobile client device or vehicle from one radio tower to another radio tower while the vehicle or device is moving across the service area. Also, in some instances Wi-Fi may be available for users on the move so that a wireless base station connects directly to an Internet service provider, rather than through the telephone system.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud-based remote access to a vehicle service are configured to collect and provide features such as those described herein.

Any application and other scripted code components may be stored on a non-transitory computing machine-readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol—HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

What is claimed is:

1. A cloud-based system for granting vehicle access, comprising:
one or more cloud based servers having of one or more processors, and configured to cooperate with one or more cloud based databases;
a set of different access control telegram messages in the one or more databases, where the set of different access control telegram messages include access control telegram messages corresponding to key fobs in the market, including a first key fob of a first vehicle from a first vehicle manufacture and a second key fob of a second vehicle from a second vehicle manufacture;
wherein in response to receiving a first vehicle matching data of a vehicle associated with a user, the one or more processors of the one or more cloud based servers being configured to execute instructions to obtain a first access control telegram message from the set of different access control telegram messages in the one or more databases, where the obtaining of the first access control telegram message is based on referencing the first vehicle matching data of the vehicle associated with the user with the first access control telegram message, and according to one of requested actions i) to emulate registering procedures matching requirements of the vehicle to learn a new authentication key and to register that new authentication key to the vehicle associated with the user, or ii) to request remote access to open and/or to unlock the vehicle associated with the user.

2. The cloud-based system of claim 1, wherein the first vehicle matching data includes one or more of i) a Make and Model of the vehicle associated with the user, ii) a user ID corresponding to the user associated with the vehicle, and iii) a Vehicle Identification Number of the vehicle associated with the user, and wherein the obtaining of the first access control telegram message is based on one of the Make and Model of the vehicle, the user ID corresponding to the user of the vehicle, or the Vehicle Identification Number of the vehicle.

3. A method to learn and then pair with a pre-installed access control system of a vehicle, comprising:
exchanging communication between the pre-installed access control system in that vehicle and i) a backend cloud-based system having one or more servers running on a first group of one or more processors or ii) a handheld computer device having a second group of one or more processors;
exchanging communication between the pre-installed access control system in that vehicle and a learning device to extract any required data for the access control system including its particular authentication code, one time, for that vehicle, where the pre-installed access control system in that vehicle has one or more receiving devices and a controller that manages key credentials;

registering the vehicle with the backend cloud-based system by sending a set of vehicle matching data to the backend cloud-based system, where the set of vehicle matching data is stored in a database associated with the backend cloud-based system and is used by a first routine running on the first group of processors of the servers of the backend cloud-based system to obtain and send a first access control telegram message of the vehicle;

registering the learning device, which facilitates as a key like simulator, to a memory in the pre-installed access control system in the vehicle in accordance with learning procedures implemented particular to that vehicle's Make and Model when adding regular remote entry keys as an additional remote entry key of the pre-installed access control system of the vehicle, where the learning device is coupled to a Radio Frequency signal transmitter, where the RF signal transmitter is used for transmitting RF signals to a Radio Frequency receiver associated with the access control system of the vehicle, where the learning device is also coupled to a Low Frequency (LF) transponder, where the LF transponder is used for communicating LF signals with an immobilization system associated with the access control system of the vehicle, where the RF signal transmitter has one or more Application-Specific Integrated Circuits (ASICs) to be highly configurable in generating a set of two or more stable RF signals at multiple frequency wavelengths, where the registration of the learning device to facilitate as the additional remote entry key for the vehicle includes the following i) receiving by the learning device, a first LF transponder configuration and data memory set corresponding to the access control system of the vehicle from the backend cloud-based system, where the first LF transponder configuration and data memory set matches the requirements of that particular Make and Model of the vehicle including the specific frequency wavelengths of access control system to register the additional remote entry key in the access control system of the vehicle, where the backend cloud based server cooperates with the database to select the first LF transponder configuration and data memory set from a set of two or more LF transponder configuration and data memory sets organized by the Make and Model of a vehicle, ii) pairing the learning device with the pre-installed access control system of the vehicle by communication between LF transponder and the immobilization unit, iii) transmitting learned data and configuration for at least one or both of the RF communication and the LF communication from the learning device to the backend cloud system, and iv) use of the backend cloud system stored data for further communication with the vehicle.

\* \* \* \* \*